US008432357B2

(12) United States Patent
Ogura et al.

(10) Patent No.: US 8,432,357 B2
(45) Date of Patent: Apr. 30, 2013

(54) TRACKING OBJECT SELECTION APPARATUS, METHOD, PROGRAM AND CIRCUIT

(75) Inventors: Yasunobu Ogura, Osaka (JP); Yusuke Monobe, Kyoto (JP)

(73) Assignee: Panasonic Corporation, Osaka (JP)

( * ) Notice: Subject to any disclaimer, the term of this patent is extended or adjusted under 35 U.S.C. 154(b) by 162 days.

(21) Appl. No.: 13/133,223

(22) PCT Filed: Oct. 5, 2010

(86) PCT No.: PCT/JP2010/005956
§ 371 (c)(1), (2), (4) Date: Jun. 7, 2011

(87) PCT Pub. No.: WO2011/043060
PCT Pub. Date: Apr. 14, 2011

(65) Prior Publication Data

US 2011/0241991 A1 Oct. 6, 2011

(30) Foreign Application Priority Data

Oct. 7, 2009 (JP) ................................ 2009-233289

(51) Int. Cl.
*G06F 3/033* (2006.01)

(52) U.S. Cl.
USPC ......... 345/158; 382/103; 348/169; 348/222.1

(58) Field of Classification Search ......................... None
See application file for complete search history.

(56) References Cited

U.S. PATENT DOCUMENTS

| | | | | |
|---|---|---|---|---|
| 8,265,474 | B2 * | 9/2012 | Kanayama | 396/95 |
| 8,355,046 | B2 | 1/2013 | Fujii | |
| 8,379,986 | B2 * | 2/2013 | Tsurumi | 382/203 |
| 2006/0012681 | A1 | 1/2006 | Fujii | |
| 2006/0092292 | A1 | 5/2006 | Matsuoka et al. | |
| 2008/0240563 | A1 | 10/2008 | Takano et al. | |
| 2010/0026721 | A1 * | 2/2010 | Park et al. | 345/660 |
| 2010/0046798 | A1 * | 2/2010 | Miyazaki | 382/103 |
| 2010/0066847 | A1 | 3/2010 | Suzuki et al. | |
| 2011/0019027 | A1 | 1/2011 | Fujita et al. | |

FOREIGN PATENT DOCUMENTS

| | | |
|---|---|---|
| CN | 1722826 | 1/2006 |
| CN | 1764238 | 4/2006 |
| JP | 2004-252748 | 9/2004 |
| JP | 2007-74279 | 3/2007 |
| JP | 2008-206018 | 9/2008 |
| JP | 2008-278458 | 11/2008 |
| JP | 2009-212637 | 9/2009 |

OTHER PUBLICATIONS

International Search Report issued Nov. 22, 2010 in International (PCT) Application No. PCT/JP2010/005956.

* cited by examiner

*Primary Examiner* — Jason Olson
(74) *Attorney, Agent, or Firm* — Wenderoth, Lind & Ponack L.L.P.

(57) ABSTRACT

A tracking object selection apparatus which selects a tracking object. The tracking object selection apparatus includes a synthesis unit which synthesizes an input image and an image so that the image is disposed at a predetermined position, a display unit, and a selection unit which selects, as the tracking object in a predetermined process, a detected object when an operation is performed on the image displayed at the predetermined position.

19 Claims, 27 Drawing Sheets

1a(1)
Input image
Object detection unit 301
Tracking unit 302
Feature extraction unit 303
Determination unit 304
Storage unit 305
3D
Synthesis unit 306
Display unit 307
Selection unit 308

1a(1)
Camera
104
Display unit
103
Imaging device
102
ROM
1P
101
CPU
1L, 1C
110
108
I/F
106
External storage unit
105
RAM 1a(1)
Input image
Object detection unit
301
Tracking unit
302
Feature extraction unit
303
Determination unit
304
Storage unit
305
3D
Synthesis unit
306
Display unit
307
Selection unit
308

Start
Detect object
S401
Track object
S402
Extract feature
S403
Estimate orientation of object
S404
Estimation difference < previous estimation difference?
S405
Yes
No
Update estimation difference
S406
Store detected object
S407
Display face image at predetermined position
S408

Start
S501
Display object at predetermined position
S501a
Display object at first time
S501b
Display, at second time, same object as at first time
S502
Select object to be tracked
End 303
303b
303b1 303b2 303b3
75-degree right face detection unit
30-degree right face detection unit
Front face detection unit
1001
1002
1003
1004

1b
Input image
Object detection unit
1501
Tracking unit
1502
Feature extraction unit
1503
304
Character recognition unit
1504
Storage unit
1505
Synthesis unit
1506
Display unit
1507
Selection unit
1508

93
3D
Synthesis unit
306
91e
A
B
C
大阪550
なoo-XX
奈良330
ふXX-oo
9X
9X1
92e
92e1
92e2

1c(1)
Input image
Object detection unit
1801
Tracking unit
1802
Feature extraction unit
1803
1803a
Similarity calculation unit
1804
1804a
304
Registration DB
1809
1809a
Storage unit
1805
3D
3DW
Synthesis unit
1806
Display unit
1807
Selection unit
1808

1
103
Imaging device
9Ib(9I)
307
91
91
9C
92P
92
Selection unit
308
Tracking unit
302
302P
3D
Synthesis unit
307
9Ia(9I)
93xR
93 (93x)
93
Determination unit
304

TRACKING OBJECT SELECTION APPARATUS, METHOD, PROGRAM AND CIRCUIT

TECHNICAL FIELD

The present invention relates to a technique used in areas such as a digital still camera, a digital video camera, a network camera, and a security camera, and used for correct selection of a tracking object in a picture.

BACKGROUND ART

In recent years, small-sized electric apparatuses with imaging functions, typified by a digital still camera and a digital video camera, have become popular, and the imaging functions have been made more sophisticated.

For example, these imaging apparatuses usually include a display such as an LCD which allows users to check an image to be recorded on the display and capture an image of the object. At present, in the areas of digital still cameras and digital video cameras, some imaging apparatuses may detect a face of a person and automatically focus on the detected face (autofocus (AF)) or automatically adjust exposure according to the detected face (automatic exposure (AE)), and some may measure a smile on a detected face and control the shutter.

However, it is difficult for such imaging apparatuses to select a face to use as a basis for such control when more than one face is detected. In some cases, control of the processes such as AF and AE may be performed on the basis of an object unintended by a user. On the other hand, some imaging apparatuses allow a user to select a person and register the person's face in advance of shooting, and thereby detect only a specific person (the person of the registered face image), and some track a human or a non-human object selected by a user and control AF or AE adaptively to the tracking.

In one of the conventional techniques which allow a user to select a human or a non-human tracking object, the user specifies a region including an image of a tracking object by hand (for example, by giving a touch to the region in which a tracking object is present on a touchscreen), and an object having color features extracted from the specified region is tracked (see Patent Reference 1). In another one of the conventional techniques, an imaging apparatus detects candidate tracking objects in a picture, and selects one of them to set the selected one as a tracking object (see Patent Reference 2).

FIG. 21 shows a block diagram of the conventional technique disclosed in Patent Reference 1.

A method of processing 9A shown in FIG. 21 is one of the conventional techniques.

CITATION LIST

Patent Literature

[PTL 1] Japanese Unexamined Patent Application Publication Number 2004-252748

[PTL 2] Japanese Unexamined Patent Application Publication Number 2007-74279

SUMMARY OF INVENTION

Technical Problem

In the technique disclosed in Patent Reference 1, the tracking object needs to be static (or almost static).

FIG. 2 illustrates problems with the conventional techniques.

For example, when a user is shooting a video, many objects are moving. In such a situation, the user selects a tracking object (to be tracked in the process of AE), seeing a display such as a liquid crystal display (LCD). In the selecting, the object may move at the moment the user selects the object as a tracking object as shown in (A) of FIG. 2. Specifically, for example, an image 91 of an object is displayed as a first image 91*a*1 at a first position 91*a*1P at a first time before the object moves, and then as a second image 92*a*2 at a second position 91*a*2P at a second time. In other words, the image 91 may move (change its position) from the first position 91*a*1P to the second position 91*a*2P.

As a result of the moving, the user selects an unintended object at the position (for example, an object (not shown in the drawing) at the first position 91*a*1P at the second time when the image 91 is present at the second position 91*a*2), and thus object tracking is performed based on the erroneous selection.

Such moving of the image 91 may be caused by a three-dimensional movement of an object captured and appearing as the image 91 (see each object 103*x* in a three dimensional space on a road 103R shown in FIG. 14).

On the other hand, it is not unusual that a still picture or a video is taken using a digital camera held in a hand, without a tripod. For this reason, the image 91 may move even when the object is almost static in a three-dimensional space (for example, on the road 103R). For example, a user needs to perform an operation of a button or a touchscreen of a camera in order to select an object, and the operation may move the camera. Such a move of the camera caused by the user's operation may cause a change in relative positions of the object (the object 103*x*) and the camera (an imaging device 103), resulting in a change in the position of the image 91 (see FIG. 2) from one position to another (for example, the position 91*a*1P and the position 91*a*2P). That is, a move of a camera may thus result in an unintentional setting.

In the method disclosed in Patent Reference 2, a tracking object is selected from one or more detected candidate objects.

However, as shown in (B) of FIG. 2, when a tracking object has a low level of visibility (for example, a face to be an object is too small (see an image 91*b*) or a face is looking backward (see an image 91*c* looking diagonally backward left)), a user has a difficulty in selecting a tracking object because the user cannot (easily) discern the object to be selected as a target to be tracked.

The present invention, conceived to address the problems, has an object of providing a tracking object selection apparatus, a method of selecting a tracking object, and a recording medium, with each of which allows a user to select a tracking object through a simple (or easy) operation (such as making a touch) such that the user may easily (and therefore surely) select a tracking object even when the object is not static (for example, the image 91*a*) or has a low level of visibility (for example, the image 91*b* and the image 91*c*).

Solution to Problem

In order to solve the problems, a tracking object selection apparatus which selects a tracking object according to a first aspect of the present invention includes: an object detection unit configured to detect a predetermined object in an input image (detect an object in the input image (a second input image) captured by a camera); a tracking unit configured to track the object detected by the object detection unit and calculate a candidate tracking object region in which the tracking object is present; a synthesis unit configured to synthesize the input image (a first input image) and an image of the candidate tracking object region calculated by the tracking unit so that the image of the candidate tracking object region is disposed at a predetermined position in the input image (a second image of the object of a first image included in the first picture is disposed in the second input image); a display unit configured to display the input image in which the image of the candidate tracking object region is disposed at the predetermined position as a result of the synthesis by the synthesis unit (the first input image after the synthesizing); and a selection unit configured to select a tracking object in a predetermined process (for example, AF), wherein, when a user performs an operation (for example, giving a touch) on the image displayed on the display unit and disposed at the predetermined position in the input image as a result of the synthesis, the selection unit is configured to select, as the tracking object, the object (for example, (a face of) a person or a car) detected in the image on which the operation has been performed.

In this configuration, (synthesized images of) candidate tracking objects are displayed at the predetermined position even in the case where the tracking objects are moving when the user is making a selection from a plurality of objects (to set an object as the tracking object to be tracked by the tracking object selection apparatus), so that the user may correctly select an object as intended.

Furthermore, a tracking object selection apparatus according to a second aspect of the present invention, having the above configuration and effects, further includes: feature extraction unit configured to extract a predetermined feature from the image of the candidate tracking object region in which the object being tracked by said tracking unit is present; a determination unit configured to calculate a state (for example, an orientation (see the image 91_c_ in FIG. 2)) of the candidate tracking object from the feature extracted by said feature extraction unit and to determine whether or not the calculated state is a predetermined state (frontal orientation or not); and a storage unit in which (the image of) the candidate tracking object region is stored when said determination unit determines that the calculated state of the candidate tracking object region is the predetermined state.

It is to be noted that "to store a region" means "to store an image of a region".

In this configuration, a state of (an image of) a candidate tracking object region (for example, the orientation of the object in the region) is determined and stored, and the stored (image of the) candidate tracking object region is displayed at a predetermined position. This allows a user to correctly select an object as intended even when the captured image of the object (the first image in the first input image) has such a low level of visibility (see (B) in FIG. 2) that the user cannot judge (or has a difficulty in judging) whether or not the object is the tracking object which the user wants to select.

The device according to the present invention may be referred to as a tracking device or other names such as an object selection device.

It is also possible that part of the display unit may include a display control unit which controls such displaying. That is, displaying of the display unit may be controlled by the display unit using the display control unit.

Advantageous Effects of Invention

The tracking object selection apparatus according to the present invention allows a user to correctly select an intended object in a picture even when the object is moving (see (A) of FIG. 2) or has a low level of visibility (specifically, a user cannot (easily) identify an object (from a plurality of objects) due to a small size or an inappropriate orientation of the objects) (see (B) of FIG. 2).

In other words, the apparatus according to the present invention allows a user to perform operations with more ease to a sufficiently high degree, with an image (the "other image" in the present description) securely and appropriately disposed.

DESCRIPTION OF EMBODIMENTS

The following describes Embodiments of the present invention with reference to the figures.

Figure 12:
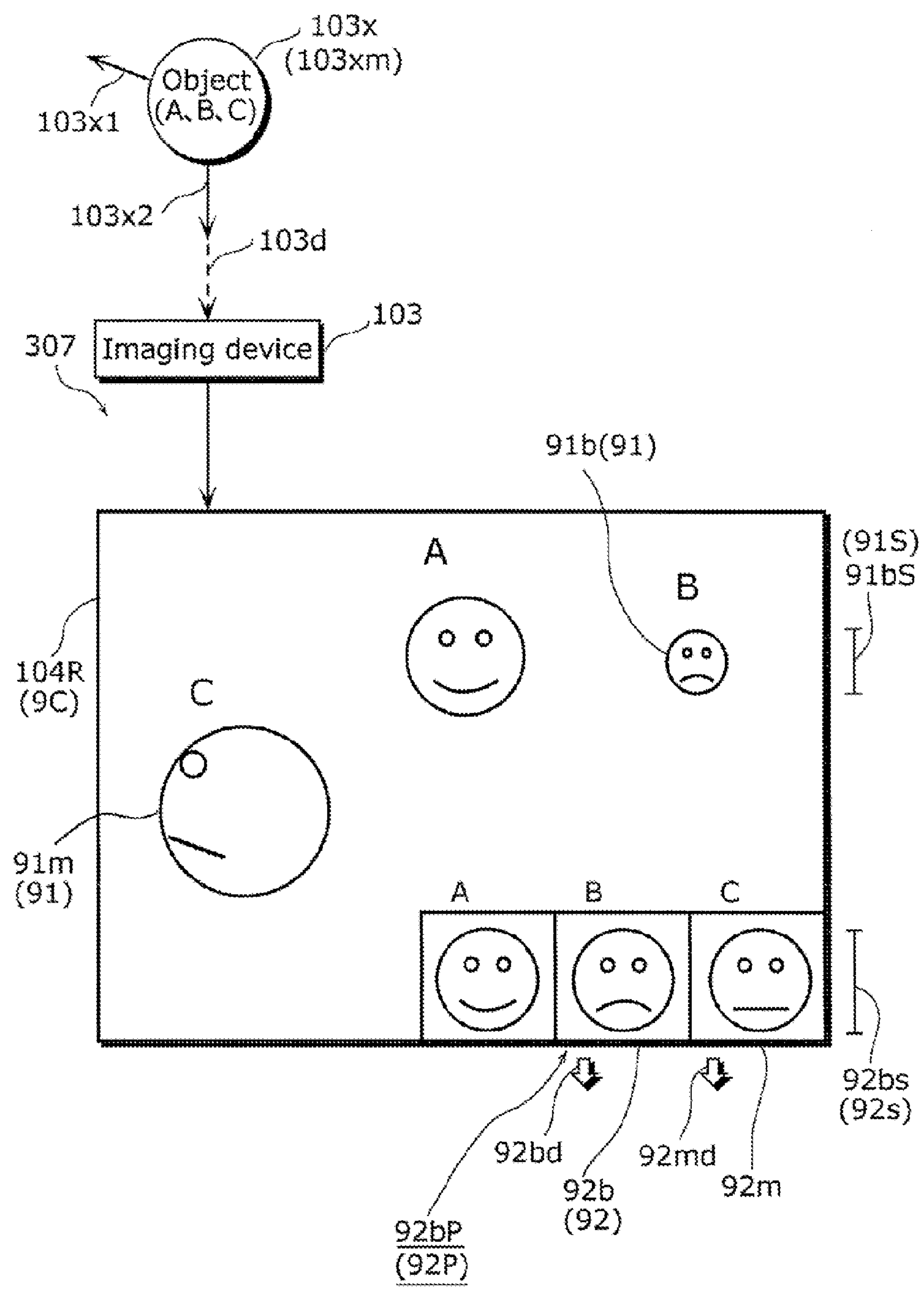
FIG. 12 illustrates a display unit according to Embodiment 1 of the present invention.
Figure 13:
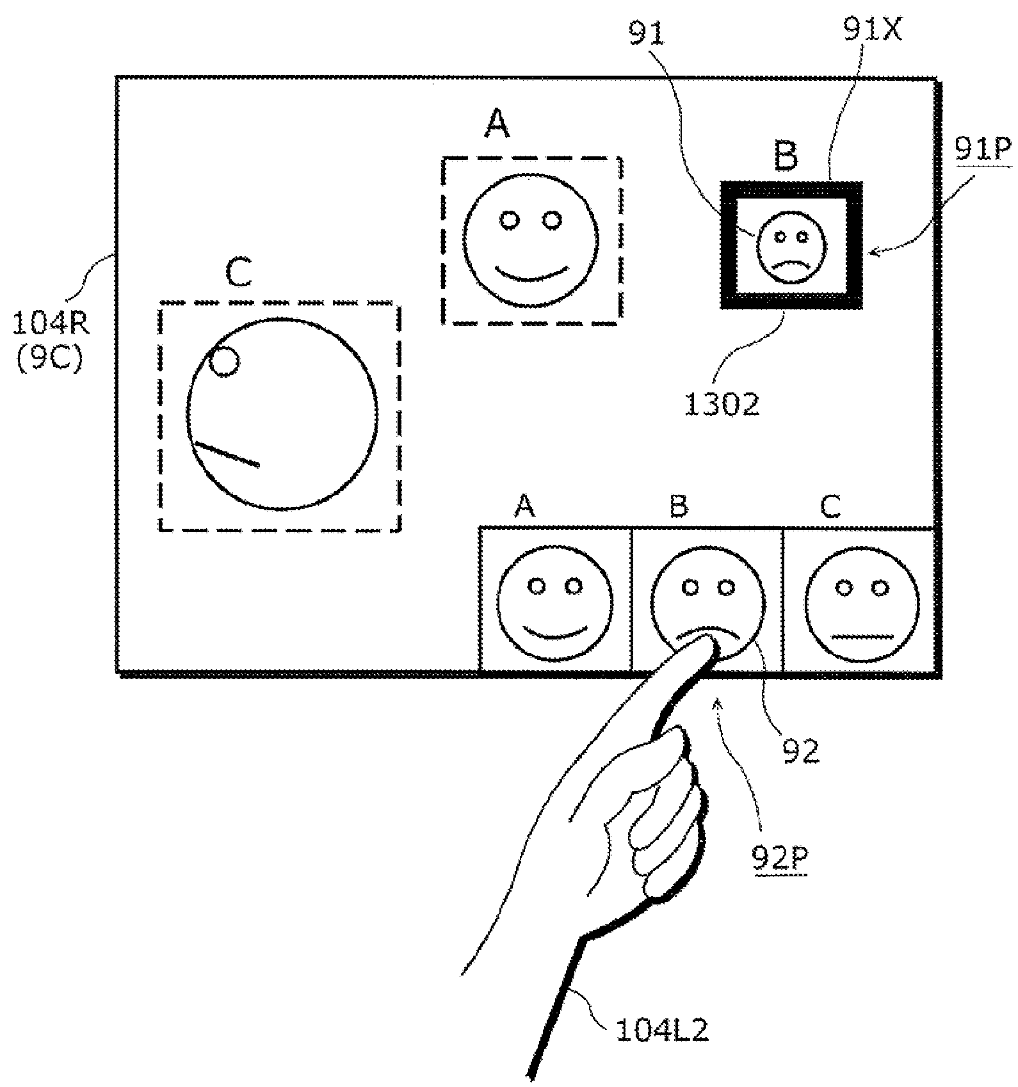
FIG. 13 illustrates a process of selecting an object according to Embodiment 1 of the present invention.

A tracking object selection apparatus according to an embodiment (a tracking object selection apparatus 1 or a camera) selects a tracking object (tracking object 103*xm* in FIG. 22) and includes: an object detection unit (an object detection unit 301 in FIG. 3 and FIG. 22) configured to detect a predetermined object (an object 301*x*) in an input image (a second input image captured by the camera; for example, a picture 9Ia); a tracking unit (a tracking unit 302) configured to track the object detected by the object detection unit (the object 301*x*) and calculate a candidate tracking object region in which the tracking object is present (an region 301*x* R (of the image 93 included in the picture 9Ia); a synthesis unit (a synthesis unit 306) configured to synthesize the input image and an image of the candidate tracking object region (an image 93 in FIG. 22 and FIG. 24 and an image 92 in FIG. 22, FIG. 12, and FIG. 13 in the region 301*x* R) calculated by the tracking unit so that the image of the candidate tracking object region is disposed at a predetermined position (fixed position, a position 92P in FIG. 22, FIG. 12, and FIG. 13) in the input image (the image 9Ib in FIG. 22 and FIG. 24, a first input image); a display unit (a display unit 307) configured to display the input image in which the image of the candidate tracking object region (the image 92 (the image 93)) is disposed at the predetermined position (a picture 9C (see FIG. 22, FIG. 24, FIG. 12, and FIG. 13) in which the image 92 is disposed at the position 92) as a result of the synthesis by the synthesis unit; and a selection unit (a selection unit 308) configured to select a tracking object (a tracking object 103*xm* in FIG. 22) in a predetermined process (for example, AF), wherein, when a user (a user 1U in FIG. 22) performs an operation (an operation 104L2 (see FIG. 22 and FIG. 13), such as touching) on the image displayed on the display unit and disposed at the predetermined position in the input image (the image 92 (or the image 93) at the position 92P in the image 9C) as a result of the synthesis, the selection unit is configured to select, as the tracking object, the object detected in the image on which the operation has been performed (the object 301*x*(for example, the object B in FIG. 12 and FIG. 13 from a plurality of objects (objects A to C)) in the image 93).

The tracking object selection apparatus may further includes: a feature extraction unit (a feature extraction unit 303) configured to extract a predetermined feature (for example, coordinates 904 in FIG. 9) from the image (the image 93) of the candidate tracking object region (the region 301*x*R) in which the object being tracked by the tracking unit is present; a determination unit configured to calculate a state of the candidate tracking object (for example, an angle 3D1*b* in FIG. 11, orientations 103*x*1 and 103*x*2 of a subject 301*x* in the image 93) from the feature extracted by the feature extraction unit (for example, the coordinates 904) and to determine whether or not the calculated state is a predetermined state (for example, (vicinity of) 0° or an orientation 103*x*2 in FIG. 12); and a storage unit (a storage unit 305) in which the image of the candidate tracking object region (the region 301*x*R, the image 93 of the region 301*x*R) is stored (the region 301*x*R or the image 93 of the region 301*x*R as a region or an image to be synthesized) when the determination unit determines that the calculated state (the angle 3D1*b* in FIG. 11) of the candidate tracking object region (the region 301*x*R, the image 93 of the region 301*x*R) is the predetermined state (for example, 0° or an orientation 103*x*2).

It is to be noted that "to store a region" means "to store an image of a region". The display unit (a display unit 307) may control display on the display unit. In other words, for example, all or part of the display unit may be the display control unit for the control.

Figure 1:
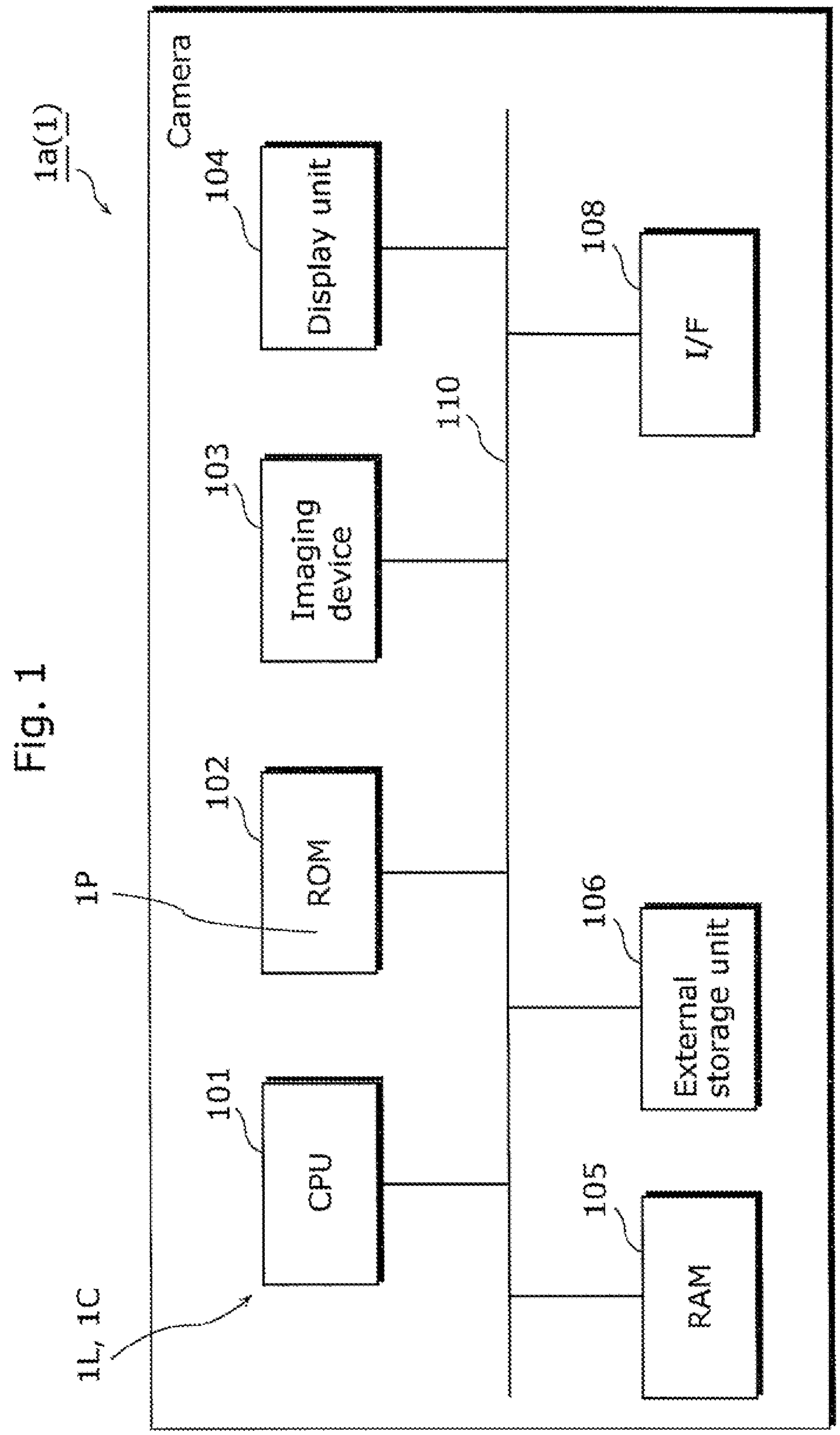
FIG. 1 shows a block diagram of the tracking object selection apparatus according to an embodiment of the present invention.
Figure 25:
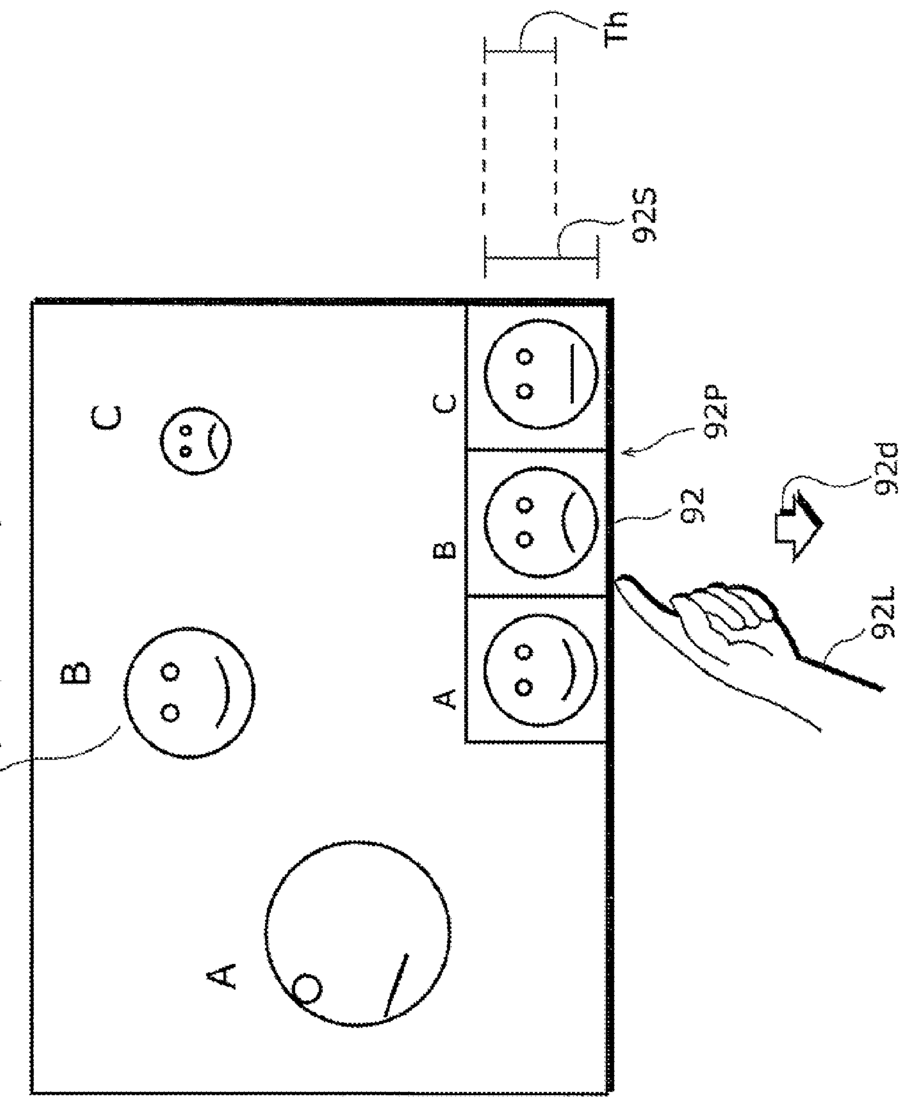
FIG. 25 shows a display.

Specifically, the tracking object selection apparatus is a camera (see FIG. 1) and includes an imaging device for capturing one image of an object (an imaging device 103 in FIG. 1 for capturing one image 91 of, for example, the object B in FIG. 25). The display unit (the display unit 307) is configured to display the captured one image (the one image 91) and an other image (an other image 92 in FIG. 25) of the object (the object B), and the selection unit (the selection unit 308) is configured to select the object (the object B) in the one image (the one image 91) as the tracking object (the tracking object 103*xm* in FIG. 22) to be tracked in a predetermined process (for example, AF), when an operation (an operation 92L in FIG. 25) is performed on the other image (the other image 92) displayed on the displayed unit.

In this configuration, the camera (or the imaging device 103) performs an appropriate operation on an captured image (the one image 91) of an object (object B) selected by a user's operation such as a touch even though the captured image may appear so different (see FIG. 2 and FIG. 26 to FIG. 28) that it is impossible (or often difficult) to predict how the captured image appears.

Specifically, the display shows, as images of the object (the object B in FIG. 25), not only one image 91, which has just been captured, but also the other image 92, which is different from the one image 91. The object (the object B) is selected upon an operation 92L on the other image 92 on the display. In this manner, a tracking object is selected only upon an operation on the other image 92 regardless of how the captured image 91 appears (see FIG. 2 and FIG. 26 to FIG. 28), so that an operation for selection is easy.

Figure 26:
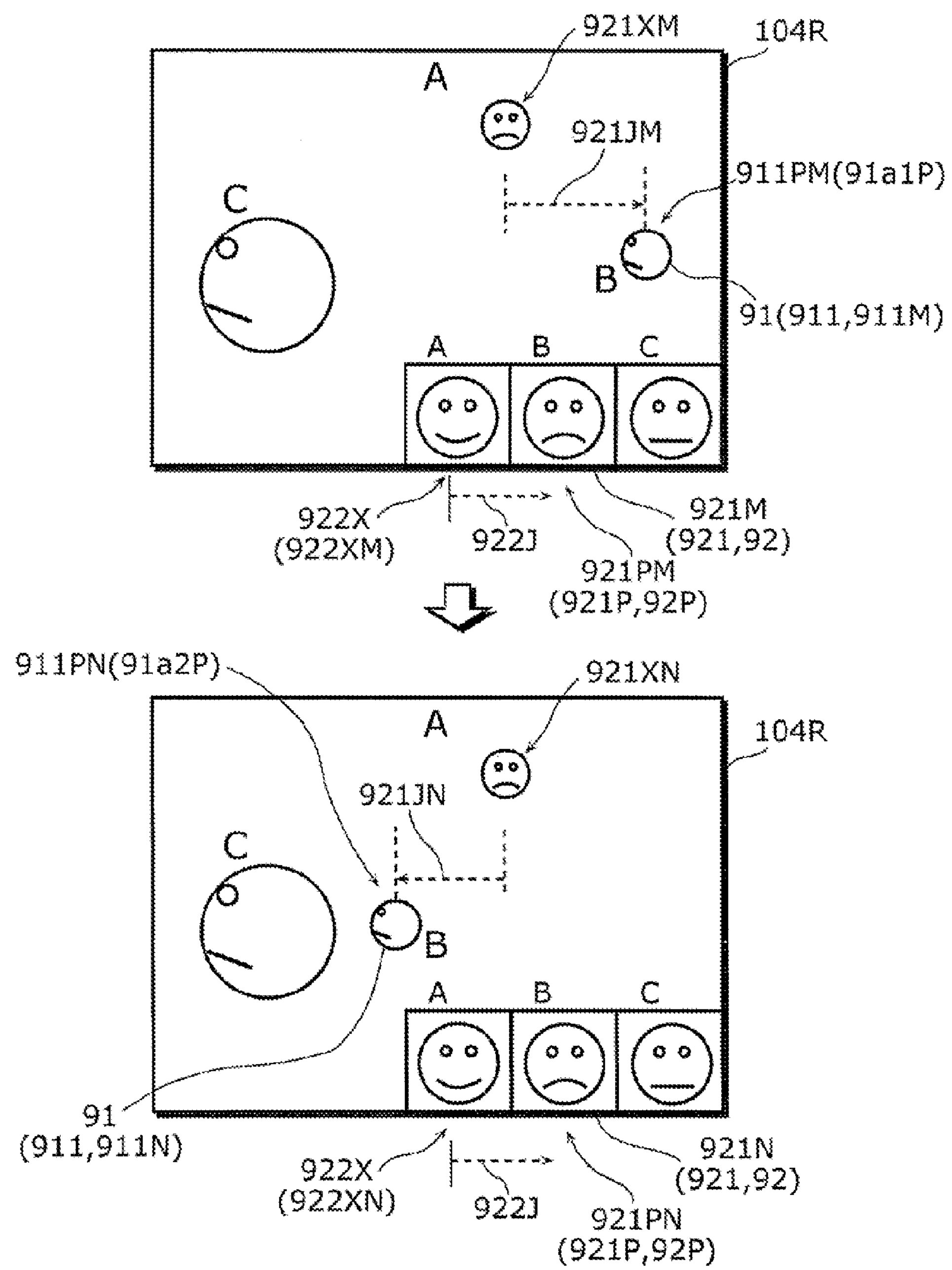
FIG. 26 shows displays at different times.

Furthermore, for example, images are disposed on pictures at different times (a first time is the time of the upper picture of FIG. 26 and a second time is the time of the lower picture). The position of one of the images displayed at the second time is the same as the position of the other image displayed at the first time (the time of the upper picture). That is, a position 921PN of the other image 921N (921) at the time of the lower picture in FIG. 26 is not a position (not provided with a reference sign) other than a position 921PM of the other image 921M (921) in the upper picture, and the position 921PN and the position 921PM are the same (that is, the position 921P).

In other words, the position 92P of the image 92P does not move (change) between different times (the first time and the second time) but remains stationary, that is, the image 92 is anchored to a common position (predetermined position) 92P.

The first time and the second time are examples of such different times. The first image 911 (in the upper and lower pictures in FIG. 26) moves from the position 911PM at the first time to the position 911PN at the second time.

Figure 2:
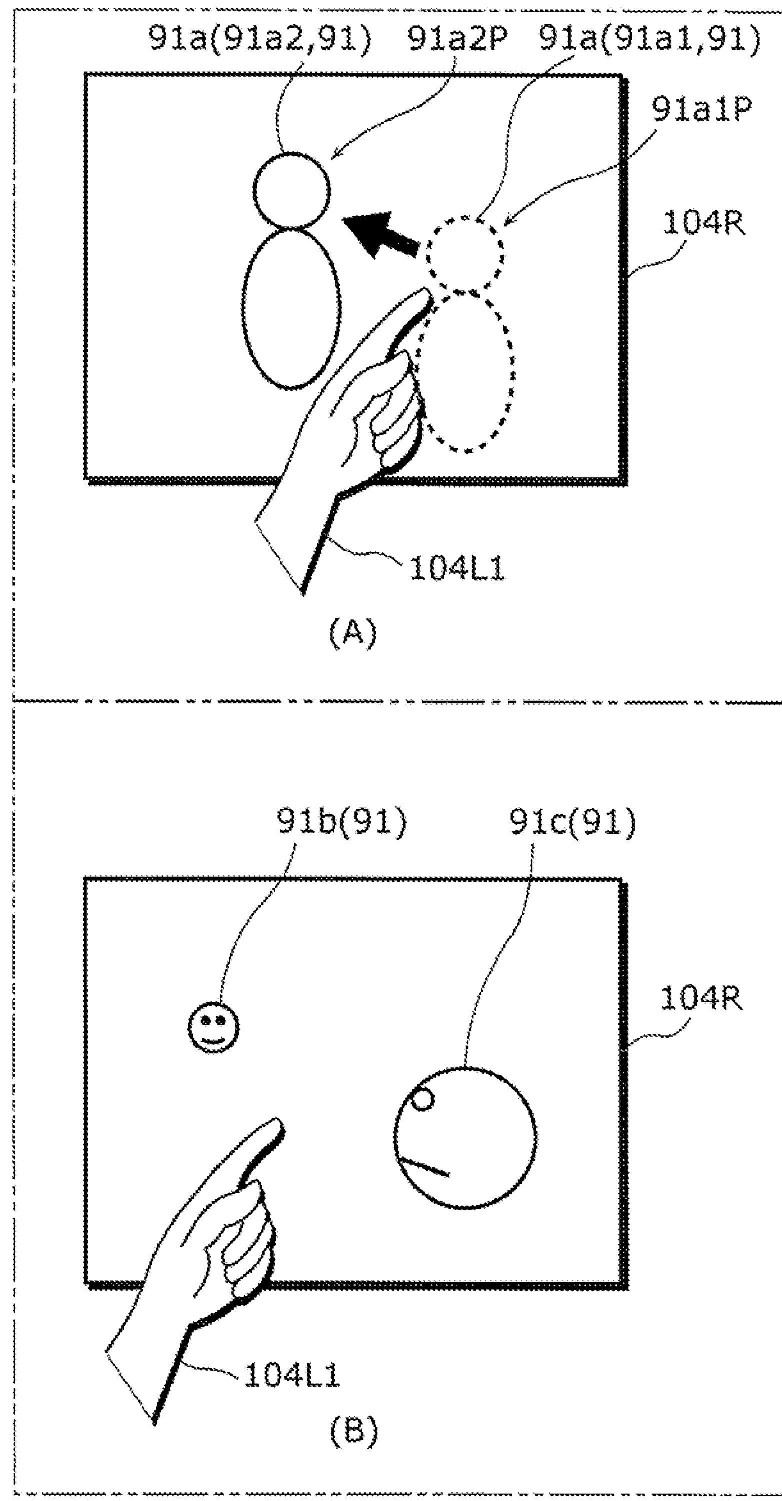
FIG. 2 illustrates problems with the conventional techniques.

In this configuration, a user who performs an operation on the image 92 is not required to specify one of different positions such as the position 911PM (in the upper picture in FIG. 26) and the position 911PN (in the lower picture in FIG. 26), or the positions 91*a*1P and 91*a*2P in FIG. 2. In other words, all the user needs to do at the second time is to perform an operation on the image at the position 921PN, which is the same as the position 921PM of the image at the first time (or they are the same position 921P), as in the case where the user performs an operation on the image at the position 921PM at the first time. The user is therefore not required to specify one of the positions and performs an operation with more ease to a sufficiently high degree.

Furthermore, although the position 911PN of the one image 911N (911) at the second time (or in the lower picture) is different from the position 911PM at the first time (or in the upper picture), the position 921PN of the other image 921P at the second time (or in the lower picture) and the same as the position 921PM at the first time (or in the upper picture) are not any different from each other but the same position 921P located in the bottom right corner of the picture. Therefore, regardless of the change in the position of the one image 911, the position 921PN of the other image 921 at the second time (or in the lower picture remains as appropriate as the position 921PM at the first time (or in the upper picture). The other image 921 is thus displayed at an appropriate position (for example, a position in the bottom right corner of the picture).

The apparatus according to the present invention thus has various advantageous effects, placing an image (the other image 92 (921)) at an appropriate position, and thereby allowing a user to perform operations with more ease to a sufficiently high degree.

Embodiment 1

In Embodiment 1, a tracking object selection apparatus (a tracking object selection apparatus la) is disclosed.

FIG. 1 shows a block diagram of the tracking object selection apparatus.

Figure 3:
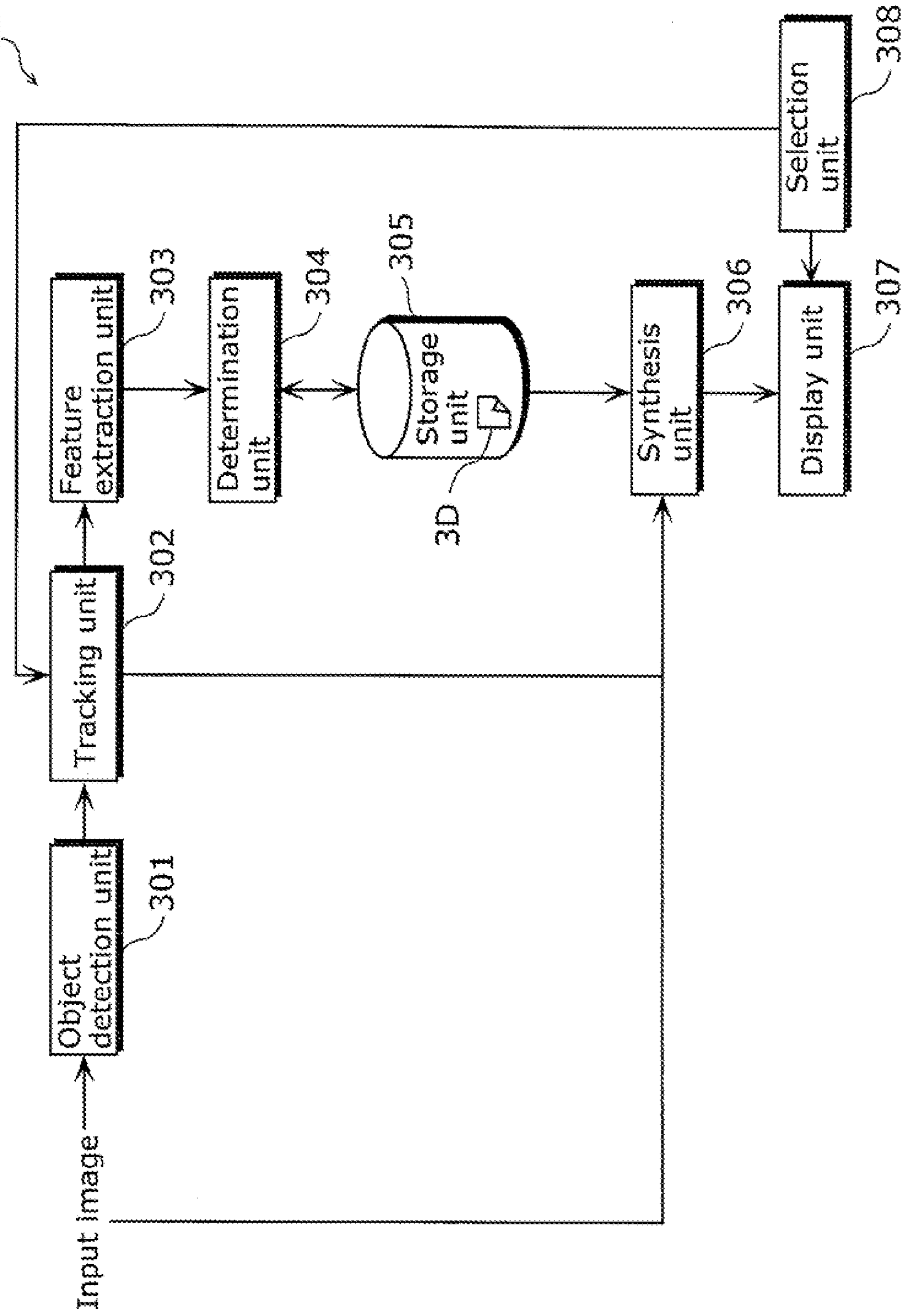
FIG. 3 shows a functional block diagram of a tracking object selection apparatus according to Embodiment 1 of the present invention.

FIG. 3 shows a functional block diagram of the tracking object selection apparatus according to Embodiment 1.

The following describes a configuration of the tracking object selection apparatus according to Embodiment 1 with reference to FIG. 1.

Referring to FIG. 1, a central processing unit (CPU) 101 executes an image processing program (for example, a computer program 1P) for processing according to a flowchart shown in FIG. 4 and FIG. 5 (described later) and controls the components shown in FIG. 3 via a bus 110. The image processing program is stored in a read-only memory (ROM) 102.

In addition, for example, a random-access memory (RAM) 105 and an external storage unit 106 have an area functioning as a storage unit 305 shown in FIG. 3 and a primary storage area necessary for the CPU 101 to perform the process.

The process of each of the processing units shown in FIG. 3 is performed by, for example, the CPU 101 through the execution of the image processing program stored in the ROM 102.

The tracking object selection apparatus includes an object detection unit 301, a tracking unit 302, a feature extraction unit 303, a determination unit 304, a storage unit 305, a synthesis unit 306, a display unit 307, and a selection unit 308.

Operations of these units are detailed later.

Figure 4:
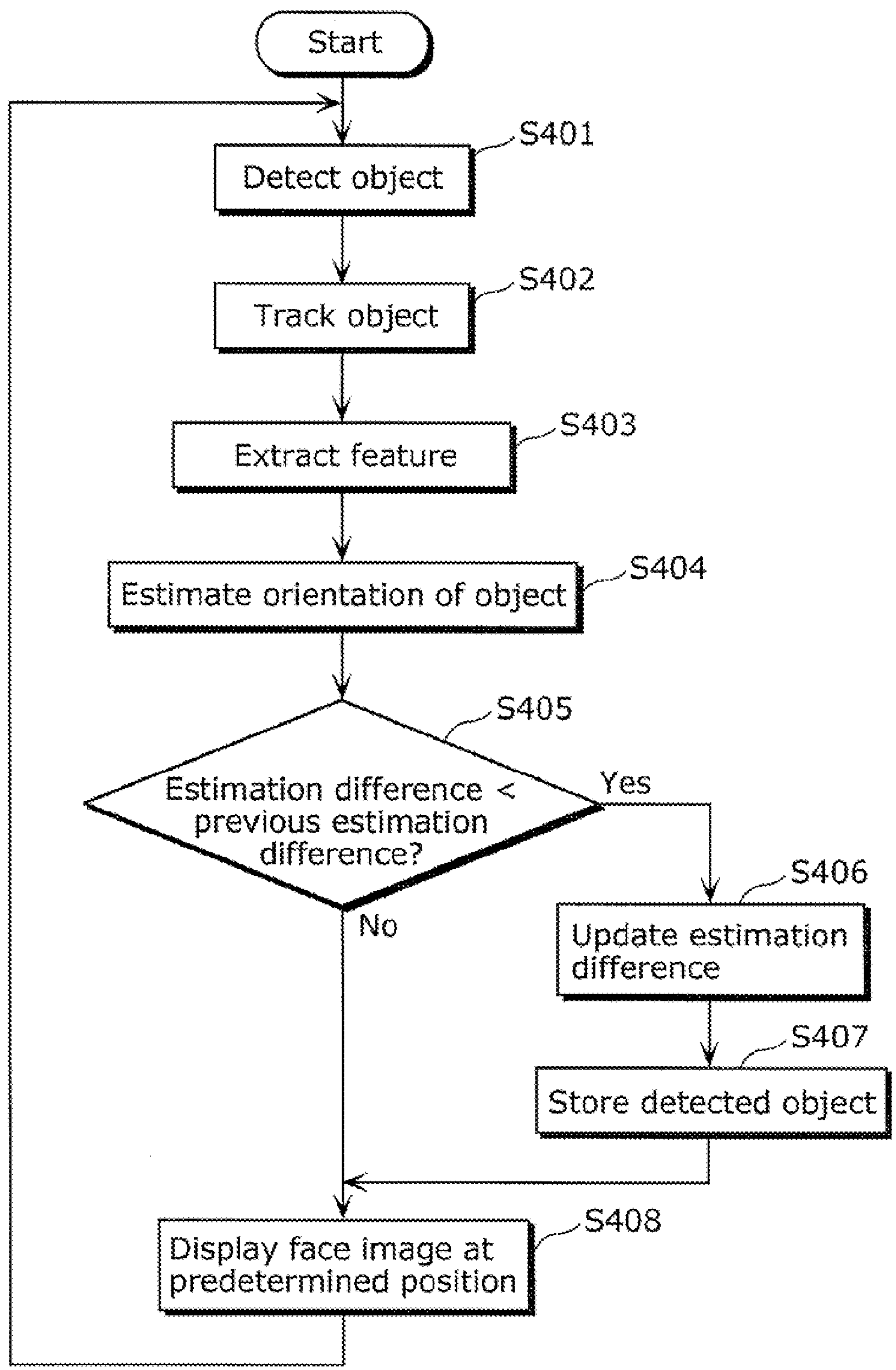
FIG. 4 shows a flowchart of processes up to displaying, illustrating a functional configuration of the tracking object selection apparatus according to Embodiment 1 of the present invention.

FIG. 4 shows a flowchart of a method of displaying a candidate tracking object according to the present invention.

The method of displaying a candidate tracking object shown in FIG. 4 is performed by the apparatus shown in FIG. 1. It is to be noted that Embodiment 1 is described using faces of persons as objects (see FIG. 7, FIG. 8, etc.) and orientations of the faces as states (see (A) and (B) of FIG. 8, the image 91*c* in FIG. 2, etc.).

In Step S401, in the tracking object selection apparatus, the object detection unit 301 detects a position and a face size of a person in a picture input from the imaging device 103.

In Step S402, the tracking unit 302 tracks the face, as a specific object, detected by the object detection unit 301.

In Step S403, the feature extraction unit 303 extracts features to be used for calculation for an orientation of the tracked face.

In Step S404, the orientation of the face is estimated (by the feature extraction unit 303, for example) from the features extracted in Step S403.

In Step S405, the determination unit 304 determines whether or not a difference between the orientation of the face estimated in Step S404 (estimation difference) and a predetermined state (for example, a frontal orientation) is smaller than a previous estimation difference.

When the estimation difference is determined to be smaller than the previous estimation difference (Yes in S405), in Step S406, the difference previously stored in the storage unit 305 is updated with the difference determined to be smaller.

In Step S407, in addition to the operation in Step S406, the face image detected in Step S401 is stored with a unique label provided to (associated with) the face image in the storage unit 305 to update data therein (see data 3D in FIG. 3).

In Step S408, the synthesis unit 306 synthesizes the face image so that the face image stored in Step S407 is displayed at a predetermined position (for example, see the position 92P in FIG. 12 and F13), and the display unit 307 displays the synthesized face image at the predetermined position.

The object detection unit 301 detects, in an image input from the imaging device 103 (input image), a candidate face to be selected by a user as a face to be tracked.

Specific detection algorithms include AdaBoost disclosed in, for example, Japanese Unexamined Patent Application Publication Number 2006-350645. For example, such an algorithm provides discriminators each of which detects a face in a specific orientation such that the process is appropriately performed (see below).

It is to be noted that the Ada Boost is not the only algorithm to be used for detecting an object.

Non-Patent Reference PRMU 107 (206) pp. 211-224 describes a possible method of detecting general objects. That is, the technique used in the present invention is applicable not only to detection of faces of persons but also to detection of general objects.

The tracking unit 302 may perform the process as shown below when, for example, the object detection unit 301 is a single system large scale integration (LSI) which may perform real-time processing (in which, for example, a process is performed 30 or more times per second). Once an object is detected at a position in a frame, the object is probably detected in the next frame in the vicinity of the position. That is, in the case where the real-time processing is possible, the tracking unit 302 may be configured to track a detected object using continuity in the position of the object.

Figure 6:
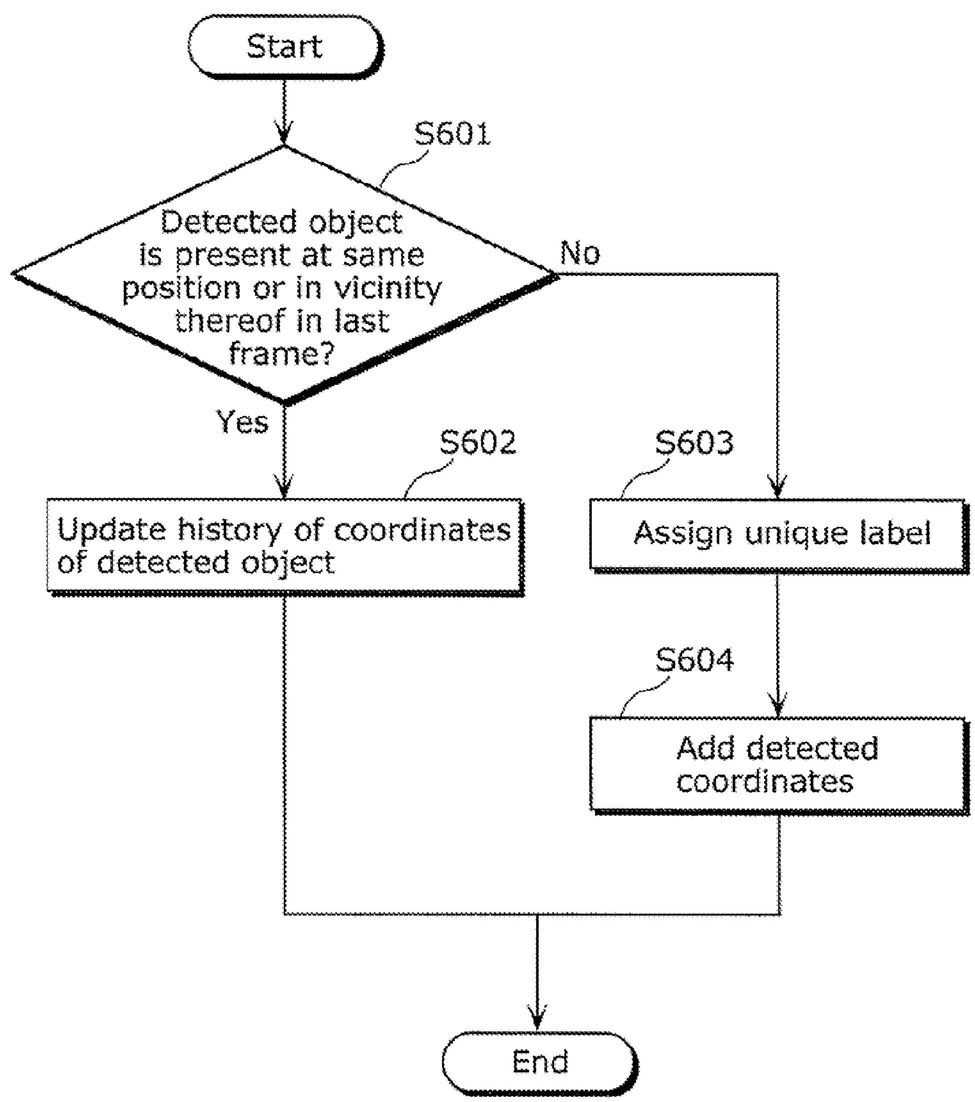
FIG. 6 shows a flowchart of an operation of a tracking unit according to Embodiment 1 of the present invention.

FIG. 6 shows a flowchart of the operation of the tracking unit.

When an object is detected at a position in a frame in Step S601, the tracking unit 302 determines whether or not the detected object is present also at the same position or in the vicinity thereof in the last frame.

When determining that the object is present at the same position or in the vicinity thereof in the last frame (Yes in S601), in Step S602, the tracking unit 302 updates history of coordinates of the detected objects (the same object as the object detected at the same position or in the vicinity thereof in the last frame).

When determining that the object is not present at the same position or in the vicinity thereof in the last frame (No in S601), in Step S603, the tracking unit 302 assigns a unique label (new label) different from labels assigned to objects previously detected.

In Step S604, coordinates of the newly detected object is added to the history of coordinates of the detected objects.

As described above, an object may be tracked using continuity in the position, but an object may be tracked using other techniques such as color matching or facial recognition.

Figure 7:
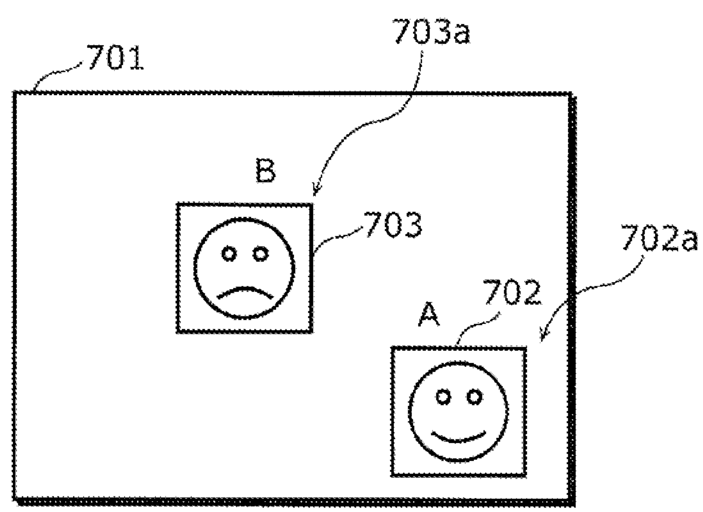
FIG. 7 illustrates the operation of the tracking unit according to Embodiment 1 of the present invention.
Figure 7:
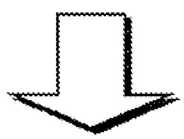
Figure 7:
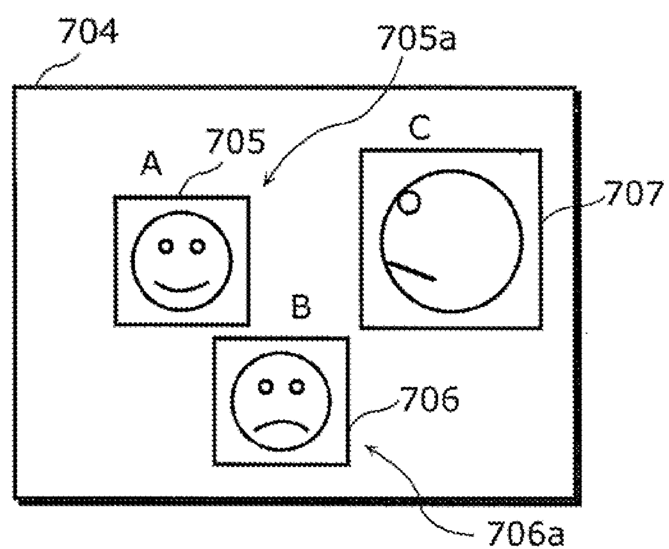

FIG. 7 shows a result of tracking.

FIG. 7 shows a case where the positions (positions 702*a* and 703*a*) of objects detected in a preceding frame 701 (the upper picture in FIG. 7) have changed to the positions (positions 705*a* and 706*a*) of objects detected in a following frame 704 (the lower picture).

In this case, the objects 702 and 703, which are already present in the preceding frame 701 (at the time of the upper picture in FIG. 7) and respectively provided with a label A and a label B, are processed as follows in the following frame 704 (at the time of the lower picture). In the process, the objects (the object in the position 702*a* and the object in the position 703*a* in the preceding frame 701) moved to the respective new positions (the position 705*a* and the position 706*a* in the following frame 704) are provided with the same respective labels. In other words, the labels are unchanged. As a result, an object 705 at the position 705*a* is provided with the label A and an object 706 at the position 706*a* is provided with the label B as shown in FIG. 7. On the other hand, a newly detected object 707 is provided with a new label C.

The following describes the feature extraction unit 303 using facial orientations of a person as an example.

Figure 8:
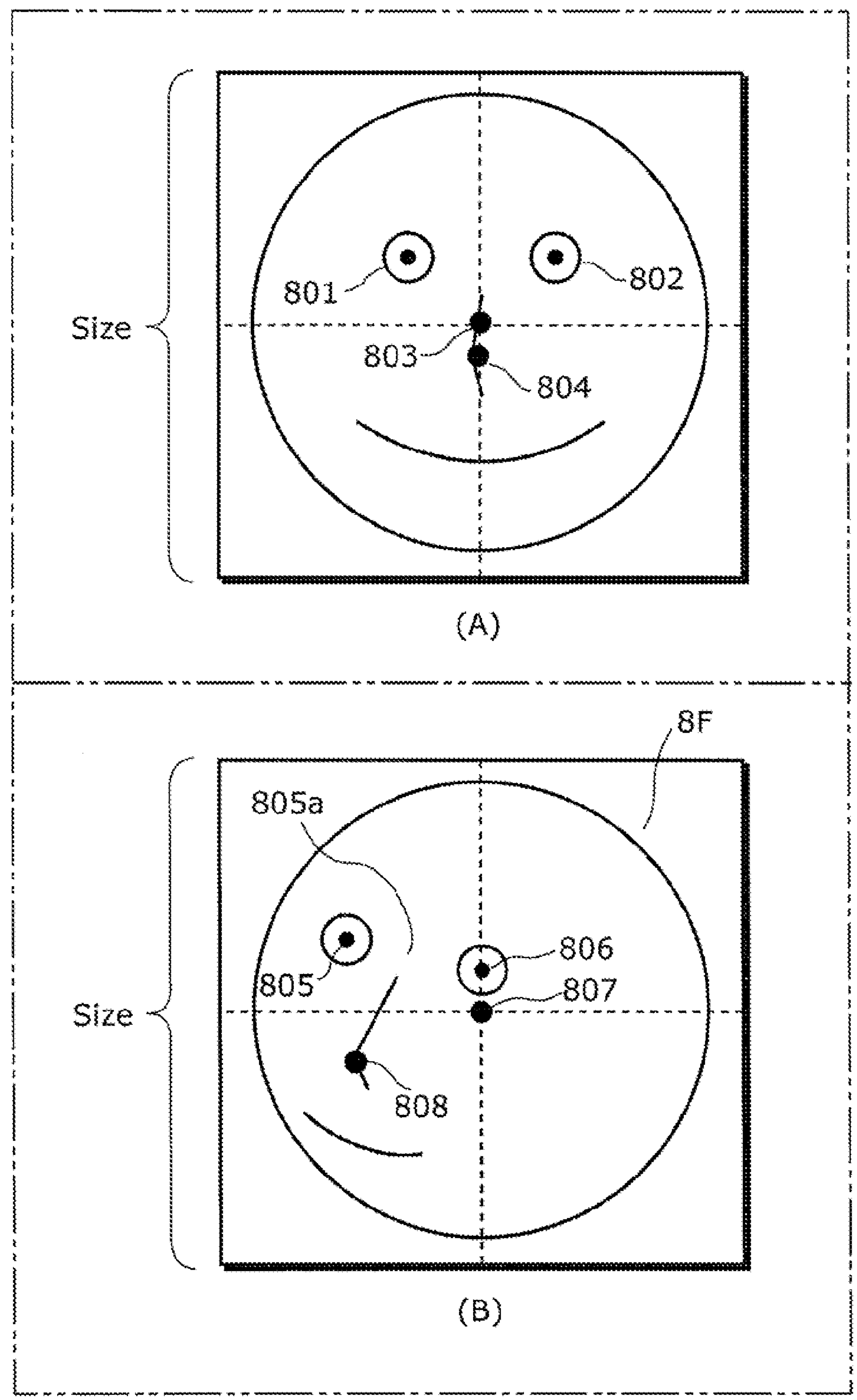
FIG. 8 illustrates calculation of an orientation of an object performed by a feature extraction unit according to Embodiment 1 of the present invention.

FIG. 8 illustrates a process of calculation of an orientation of an object performed by the feature extraction unit according to Embodiment 1 of the present invention.

For example, the feature extraction unit extracts features (attributes or characteristics) of a face such as positions of right and left eyes (for example, coordinates of two eyes 801 and 802 in (A) of FIG. 8), the center position of the face (for example, coordinates of the center position 803), the position of a nose (for example, coordinates of the position 804), and a face size (Size in FIG. 8), which make five features.

The eyes may be detected using the same algorithm as used for the detection of face of persons or using another method such as an edge-based corner detection algorithm.

Figure 9:
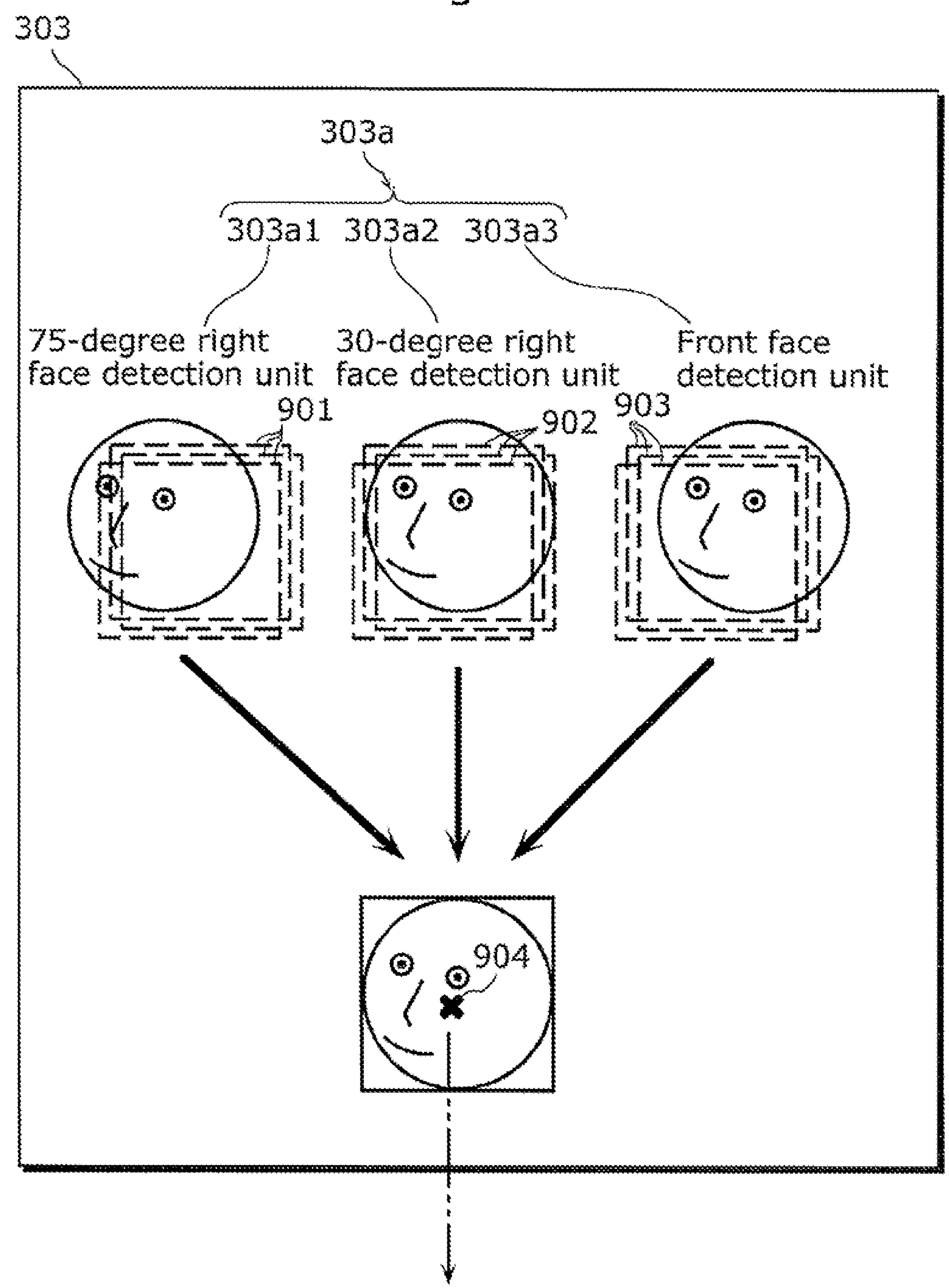
FIG. 9 illustrates calculation of the center position of a face according to Embodiment 1 of the present invention.

FIG. 9 illustrates a process of calculation of the center position of a face according to Embodiment 1 of the present invention.

A face detection unit (a face detection unit 303*a*) includes a plurality of facial orientation detection units (detection units 303*a*1 to 303*a*3) for different facial orientations. For one position where a face is present, each of the facial orientation detection units including the detection unit 303*a*1 outputs candidate boxes different in position and size from each other (see, for example, three boxes 901 output by the detection unit 303*a*1, three boxes 902 output by the detection unit 303*a*2, and boxes 903 output by the detection unit 303*a*3).

Then, the average of the coordinates of the centers of the output candidate boxes and the average of the sizes thereof are calculated, and the information resulting from the calculations is synthesized, so that coordinates of the center position of the face (coordinates 904) are obtained. That is, all of the boxes 901 output by the detection unit 303*a*1, the boxes 902 output by the detection unit 303*a*2, and the boxes 903 output by the detection unit 303*a*3 are used in this manner, so that the calculated coordinates 904 of the center position of the face has a relatively high accuracy.

Figure 10:
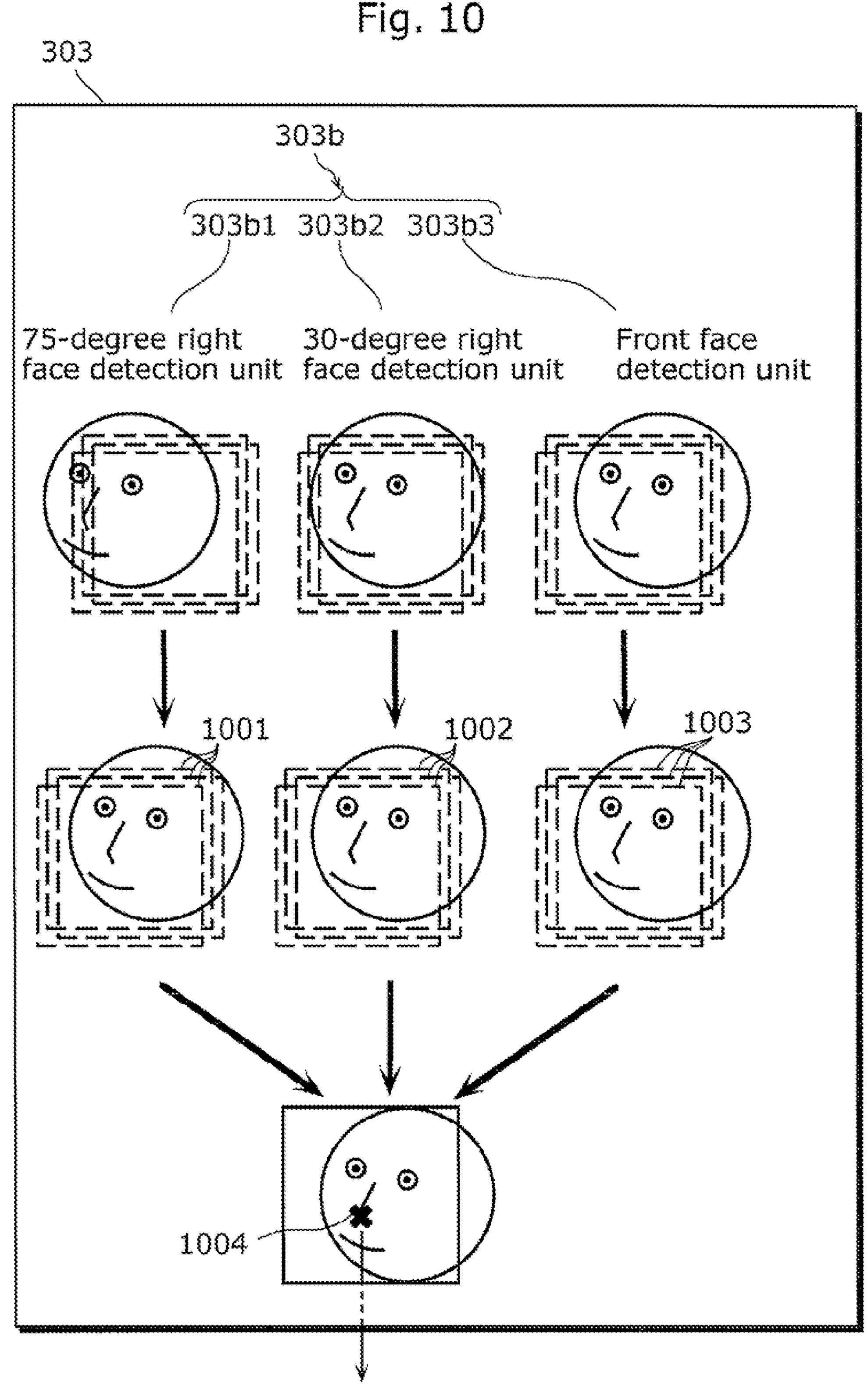
FIG. 10 illustrates calculation of coordinates of the position of a nose according to Embodiment 1 of the present invention.

FIG. 10 illustrates a process of calculation of coordinates of the position of a nose (coordinates 1004) according to Embodiment 1 of the present invention.

As in the process of calculation of the center position of a face (see FIG. 9), facial orientation detection units (for example, detection units 303*b*1 to 303*b*3) each output candidate boxes different in position and size from each other (see FIG. 9).

Processes to be performed on the output candidate boxes may vary depending on the detection units which have output the candidate boxes. Specifically, each of the candidate boxes is provided with an offset of a certain amount depending on the detection unit which has output the candidate boxes. For example, the offset to be provided is normalized to the face size. By the offsetting, the coordinates of the candidate boxes are corrected to match the position of the nose (see the corrected boxes 1001 to 1003 in FIG. 10).

Then, the average of the coordinates of the centers of the offset candidate boxes (the corrected boxes 1001 to 1003) and the average of the sizes thereof are calculated, and the information resulting from the calculations is synthesized, so that the coordinates of the nose (coordinates 1004) are obtained.

In the present example, the coordinates of the position of the nose are calculated using the outputs from the face detection units. Alternatively, the position of the nose may be detected using the same algorithm as a face of a person or another algorithm.

The following describes the determination unit 304 using, as an example, determination of facial orientations of a person.

As described above, the feature extraction unit 303 has obtained the coordinates of the positions of the right and left eyes, the coordinates of the center position of the face, the coordinates of the position of the nose, and the face size before the following process.

Next, X components ($Face_x$ and $Nose_x$ in Eq. 1 below) of the coordinates of the position of the center position of the face (for example, the coordinates 904 in FIG. 9) and the position of the nose (the coordinates 1004 in FIG. 10) are normalized to the face size (FaceSize, the denominator in Eq. 1 below), and a normalized difference ($F_n$ in the left-hand side of Eq. 1) the X components are obtained.

$$F_n = \frac{Face_x - Nose_x}{FaceSize} \quad \text{(Eq. 1)}$$

Similarly, an X component of the coordinates of the position of the center position of the face ($Face_x$ in Eq. 2 below) and an X component of the coordinates (see the coordinates 805*a* in FIG. 8) of the midpoint of the right and left eyes ($LEye_x$ and $REye_x$ in Eq. 2 below, see FIG. 8) are normalized by the face size (FaceSize, a denominator in Eq. 2 below), and a normalized difference ($F_e$ in the left-hand side of Eq. 2) between the X components are obtained.

$$F_e = \frac{\left(Face_x - \frac{(LEye_x + REye_x)}{2}\right)}{FaceSize} \quad \text{(Eq. 2)}$$

Then, angles of the facial orientation ($Dir_n$ in Eq. 3 below and $Dir_e$ in Eq. 4 below) corresponding to the obtained normalized differences ($F_n$ in Eq. 1 and $F_e$ in Eq. 2) are obtained from lookup tables ($LUT_n$ in Eq. 3 and $LUT_e$ in Eq. 4) by table lookup. The obtained angles are facial orientation angles ($Dir_n$, $Dir_e$).

$$Dir_n = LUT_n[F_n] \quad \text{(Eq. 3)}$$

$$Dir_e = LUT_e[F_e] \quad \text{(Eq. 4)}$$

Then, the facial orientation angles ($Dir_n$, $Dir_e$) obtained by Eq. 3 and Eq. 4 above are respectively multiplied by weights ($W_n$, $W_e$) as shown in Eq. 5 below and added each other, so that a conclusive facial angle (Dir) is calculated.

$$Dir = Dir_n \times W_n + Dir_e \times W_e \quad \text{(Eq. 5)}$$

The facial orientation may be determined using more features of a face, for example, by using an algorithm for calculating a facial orientation from geometrical positions for higher accuracy.

Next, the determination unit 304 determines whether or not the calculated facial angle indicates a predetermined orientation. Hereinafter, the predetermined orientation is assumed to be a frontal orientation (see an orientation 103*x*2 in FIG. 12) for the convenience of description.

When the calculated angle indicating the facial orientation is between −10 to 10 degrees (a degree within a predetermined close range from the degree of zero), the determination unit 304 determines that the face is in the frontal orientation, and stores the value of the calculated angle indicating the facial orientation (obtained facial orientation value) and the label assigned to the object in the storage unit 305 in association with the image of the face determined to be in the frontal orientation (see the data 3D in FIG. 3).

Thereafter, the process below is performed for subsequent frames when a facial orientation value newly calculated for the same tracking object indicates a more frontal orientation than the orientation indicated by the stored calculated facial orientation value. Specifically, in the process, the image of the face in the frontal orientation and the calculated facial orientation value stored in the storage unit are updated with an image of the face for which the facial orientation value has been newly calculated and the newly calculated facial orientation value, respectively.

Figure 11:
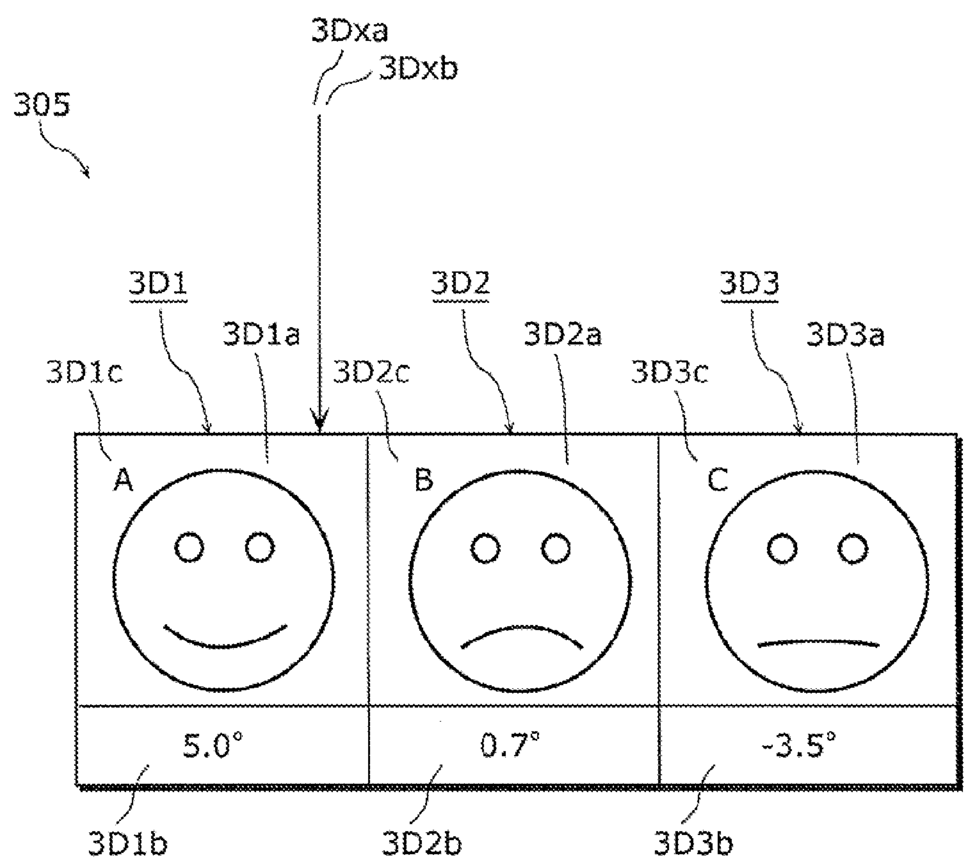
FIG. 11 illustrates a storage unit according to Embodiment 1 of the present invention.

FIG. 11 illustrates the storage unit according to Embodiment 1 of the present invention.

As a result of the appropriate process performed in the above manner, the storage unit stores images of objects (face) to be tracked (images 3D1*a* to 3D3*a*), obtained facial orientation values (values (or scores) 3D1*b* to 3D3*b*), and assigned labels (labels 3D1*c* to 3D3*c*) as shown in FIG. 11. The labels (the label 3D1*c*, etc.) are, for example, information to identify the object of each of the labeled images (for example, the object A of the image 3D1*a*) among the objects (objects A to C).

The synthesis unit 306 normalizes the size of the images of the tracking objects stored in the storage unit, and then synthesizes the images of the tracking objects resulting from the normalization and an input image. For example, the synthesis unit 306 may generate an image having a predetermined size as an image normalized (changed) in size from the stored image, and synthesizes the generated image and an input image (or integrate the generated image into an input image).

The generated image is preferably disposed so as not to be obstructive in the picture being captured. For example, the generated image may be disposed in a corner at the top or bottom of the display (for example, the bottom right corner as shown in FIG. 12).

The normalized image and the input image may be normally not synthesized and only the input image is displayed without such image synthesis. In this case, the normalized image and the input image are synthesized so that the normalized image is disposed at any desired position (for example, the bottom right corner) only when a user gives an instruction to display the normalized image. In other words, the normalized image is displayed only when a user gives the instruction.

In addition, in the input image, the label corresponding to the object may also be disposed in the vicinity of the object to which the label is assigned (for example, the letter "B" appearing in the vicinity of the image 91 in FIG. 12). This allows a user to (relatively easily) learn a correspondence between an object to be selected as a tracking object (an image of an object normalized and disposed on the input image, such as the image 92) and an actual position of the image of the object in the input image (an image captured at a position in the input image, such as the image 91), and thus enhancing usability.

FIG. 12 illustrates the display unit according to Embodiment 1 of the present invention.

The display unit 307 is caused, by the synthesis unit 306, to display an input image and an image stored in the storage unit. FIG. 12 illustrates a picture 9C generated by synthesizing a stored image and an input image.

Figure 5:
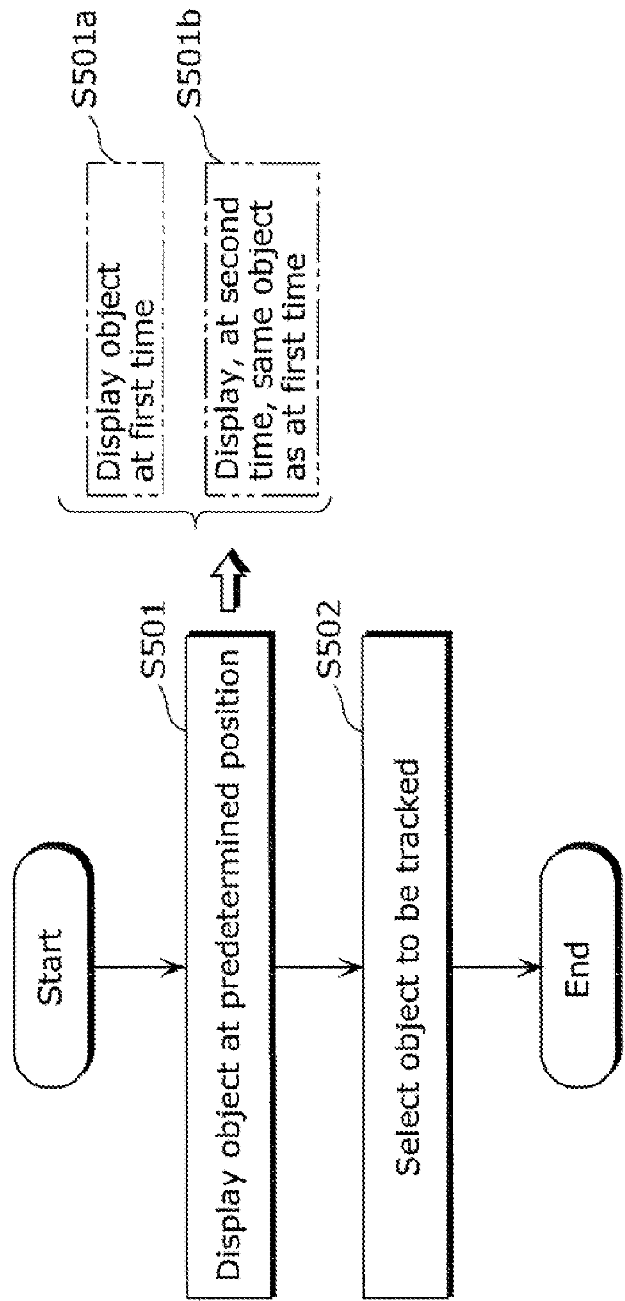
FIG. 5 shows a flowchart of a process of selection of an object to be tracked, illustrating a functional configuration of the tracking object selection apparatus according to Embodiment 1 of the present invention.

FIG. 5 shows a flowchart of a process of selection of a tracking object, illustrating a functional configuration of the tracking object selection apparatus according to Embodiment 1 of the present invention.

The following describes a method of selecting a tracking object with reference to the flowchart shown in FIG. 5.

In Step S501, an image of a candidate tracking object stored in the storage unit is displayed at a predetermined position on the display unit. For example, at a first time (the time of the upper picture of FIG. 26), an image of a candidate tracking object is displayed at a position (S501*a*), and at a second time, the candidate tracking object is displayed at a position (a position 921PN) which is the same as the position (a position 921PM) of the image at the first time.

In Step S502, a user selects (or causes the apparatus 1 to select) a tracking object from among the candidate tracking objects displayed at the predetermined position, by performing an operation (for example, giving a touch on the image (the image 92 in FIG. 12) disposed on the input image and displayed on the display unit). Specifically, for example, a user may select an object (the object B in FIG. 12) by performing an operation (such as giving a touch) on the predetermined position (the position 92*b*P in FIG. 12) where the image (the image 92*b* in FIG. 12) of the object disposed on the input image is displayed.

FIG. 13 illustrates a process of selecting an object according to Embodiment 1 of the present invention.

As shown in FIG. 13, a user is allowed to select a tracking object (for example, an object B) by touching a face image of the object among face images (face images 92 of objects A to C) each in a frontal orientation at a predetermined position (for example, a position 92P), and thus avoids making an erroneous selection.

After the user selects an object, a target frame (see a box of a thick line 91x around the image 91 of the object B in FIG. 13) is displayed only around the selected object, and AE and AF operations are performed only for the selected object. In addition, after the user selects an object, the display 104R may be displayed without placing the image 92 stored in the storage unit on the input image.

Figure 14:
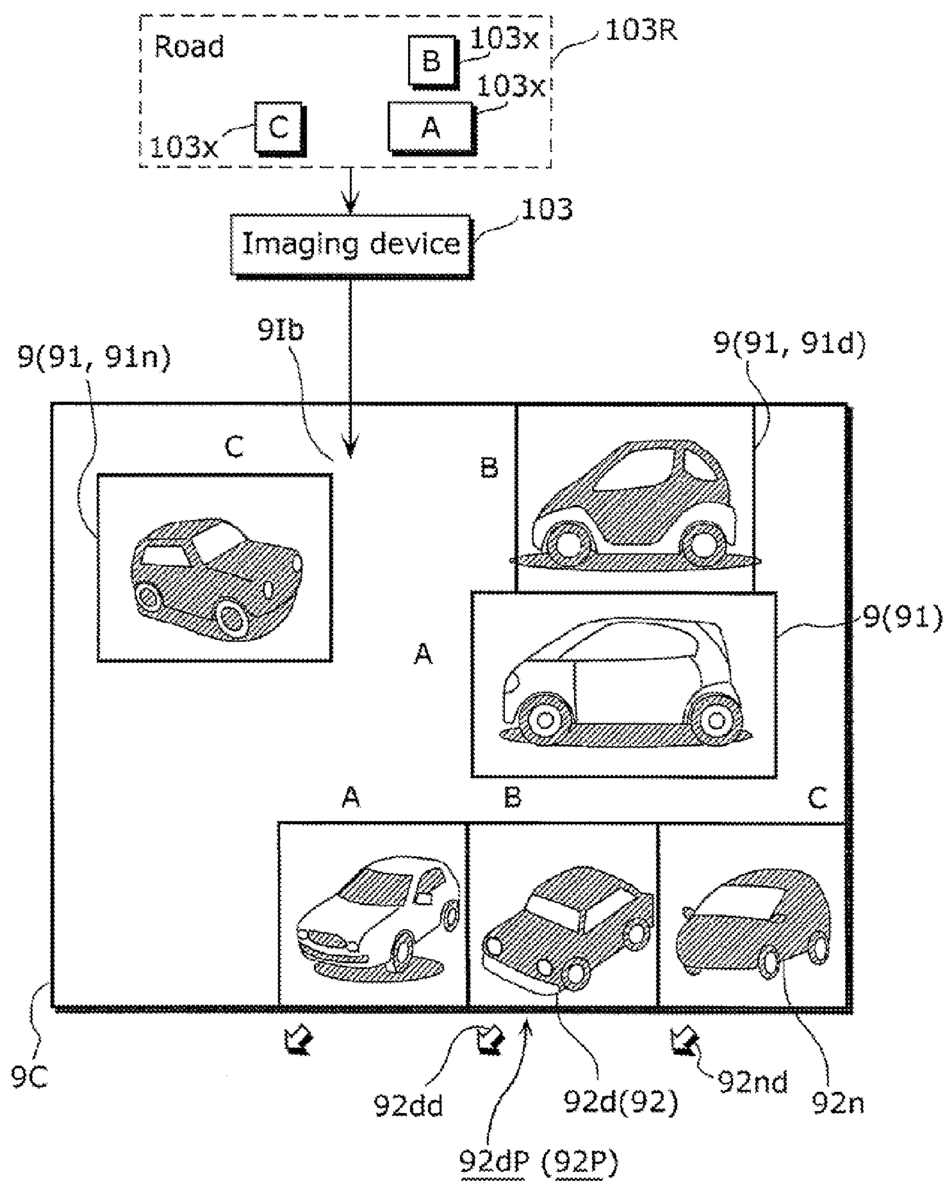
FIG. 14 illustrates another example according to Embodiment 1 of the present invention.

FIG. 14 illustrates another example according to Embodiment 1 of the present invention.

In Embodiment 1, the process described above using a face of a person as an example may be performed for an object other than a person, such as a car as shown in FIG. 14.

The feature extraction unit may extract, as a feature, an edge or a frequency component of a face image to be measured for a smile rating. The face image is measured for a smile rating by the determination unit on the basis of the extracted feature, and the smile rating is stored in the storage unit, and then a scene of the face image may be output as a still image. Specifically, for example, when a face image for which a relatively high smile rating is measured on the basis of the feature extracted from the face image, the face image may be output, and the output face image may be disposed on the input image (the image 92).

Embodiment 2

Figure 15:
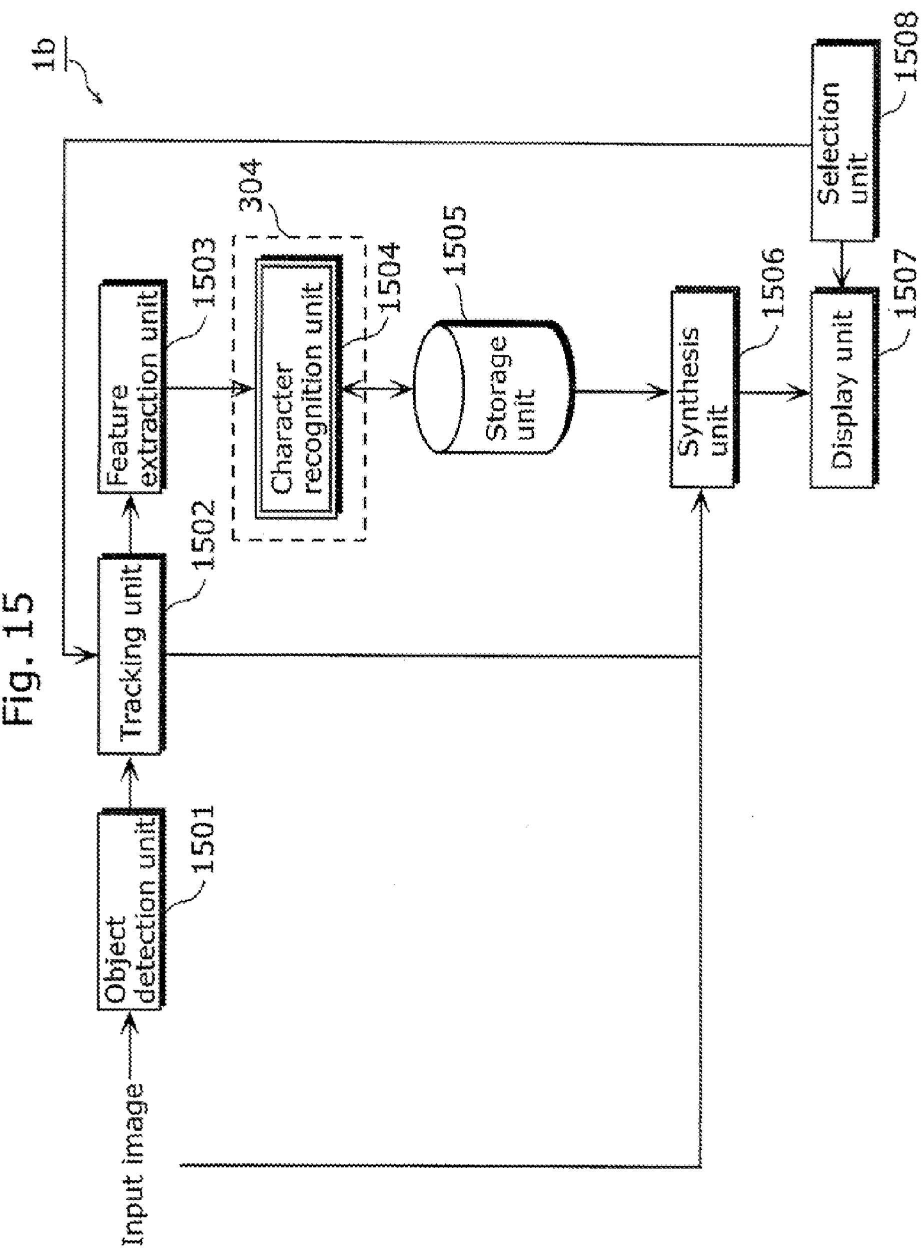
FIG. 15 shows a functional block diagram illustrating a functional configuration of a tracking object selection apparatus according to Embodiment 2 of the present invention.

FIG. 15 is a functional block diagram of a tracking object selection apparatus which uses character information according to Embodiment 2 (an apparatus 1*b*).

The apparatus 1*b* includes an object detection unit 1501, a tracking unit 1502, a feature extraction unit 1503, a character recognition unit 1504, a storage unit 1505, a synthesis unit 1506, a display unit 1507, and a selection unit 1508.

Operations of these units are detailed later.

Figure 16:
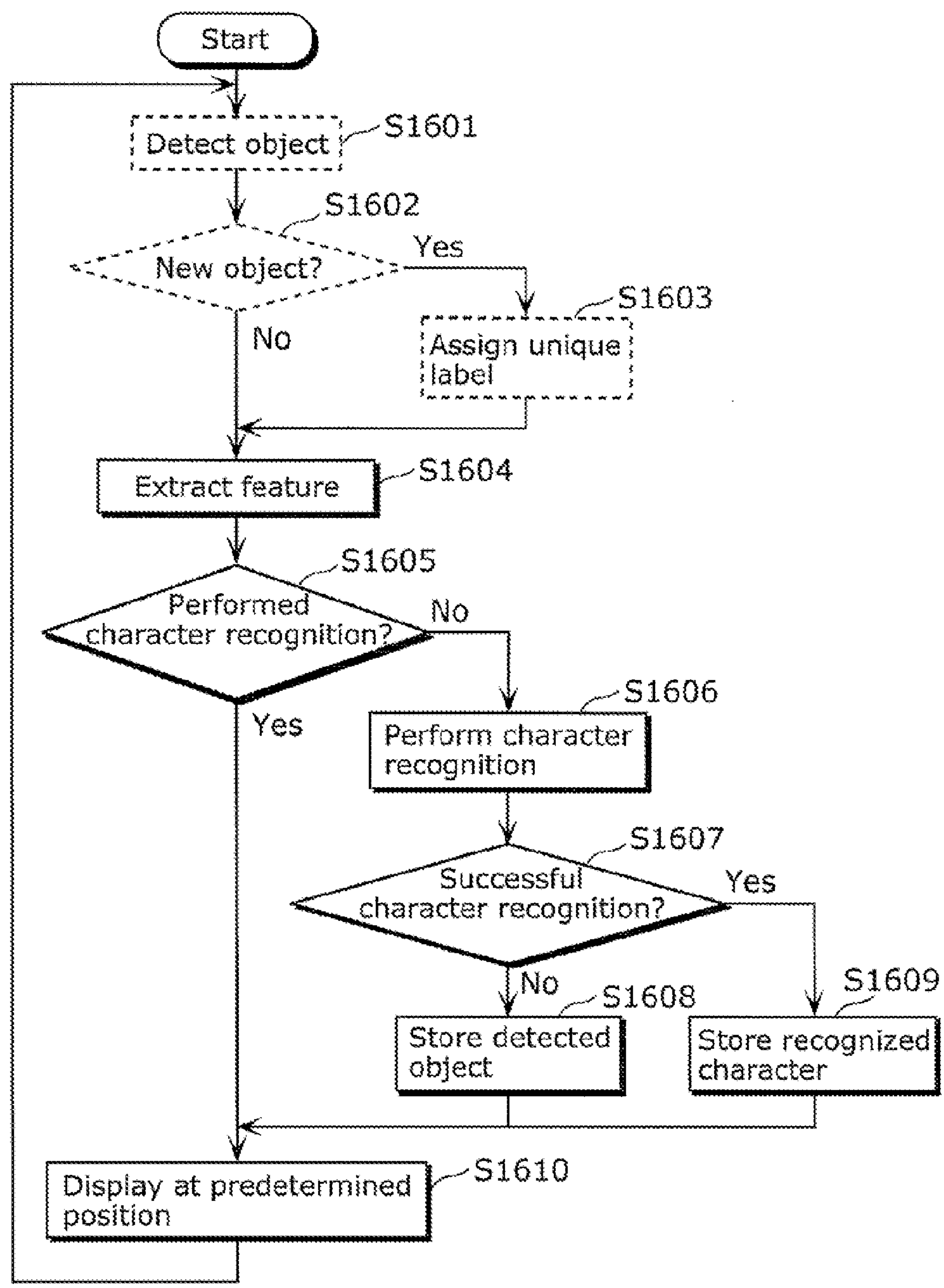
FIG. 16 shows a flowchart of processes up to displaying, illustrating the functional configuration of the tracking object selection apparatus according to Embodiment 2 of the present invention.

FIG. 16 shows a flowchart up to a display process, illustrating a functional configuration (a process configuration) of the tracking object selection apparatus according to Embodiment 2 of the present invention.

Embodiment 2 has many features in common with Embodiment 1, and thus the following particularly describes steps performed by the character recognition unit and the following steps (Step S1604 and later) in detail.

In Step S1604, the feature extraction unit 1503 extracts a feature necessary for character recognition from an image of a candidate tracking object.

In Step S1605, the feature extraction unit 1503 determines whether or not character recognition has been performed for the candidate tracking object.

When character recognition has not been performed for the candidate tracking object, in Step S1606, the character recognition unit 1504 performs character recognition using the extracted feature.

In S1607, the character recognition unit 1504 determines whether or not the character recognition has been successful.

When the character recognition has not been successful (No in Step S1607), in S1608, the image of the tracking object is stored.

When the character recognition has not been successful (Yes in Step S1607), in S1609, the recognized character is stored in the storage unit 1505.

In Step S1610, the image of the candidate tracking object or the character stored in the storage unit and the input image are synthesized so that the image of the candidate tracking object or the character are displayed at a predetermined position in the input image.

The character recognition unit 1504 recognizes character information specific to a tracking object. For example, information such as characters on a car license plate is recognized.

The storage unit 1505 stores both the image and the recognized character information of the tracking object (see data 3D).

The synthesis unit 1506 synthesizes the input image and either or both of the image and the character information of the tracking object (see FIG. 17 described below), and causes the display unit 1507 to display a picture resulting from the synthesis (the input image after the synthesis).

Figure 17:
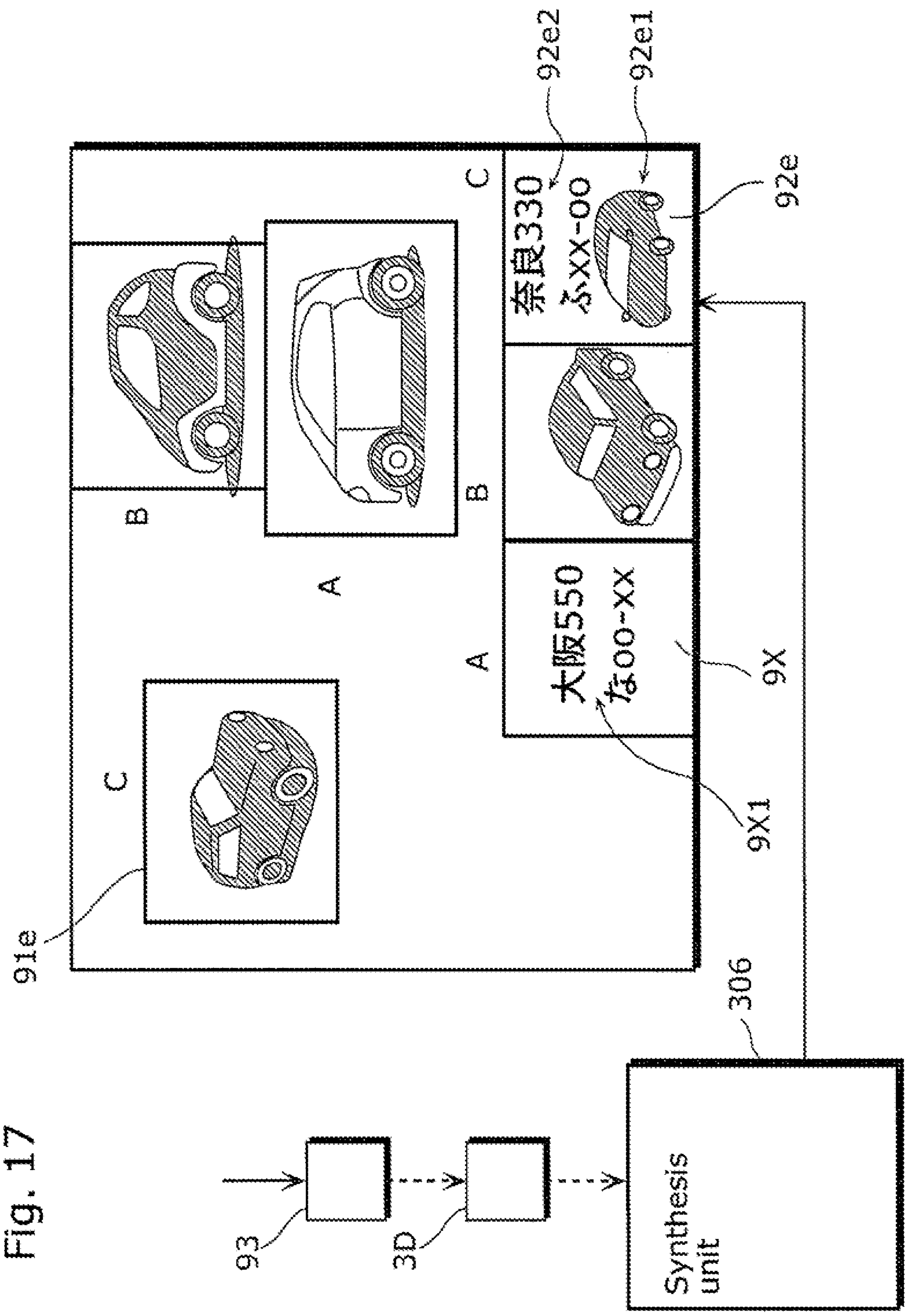
FIG. 17 illustrates an exemplary display according to Embodiment 2 of the present invention.

FIG. 17 illustrates an exemplary display according to Embodiment 2 of the present invention.

A user may have such a display as shown in FIG. 17.

Embodiment 3

Figure 18:
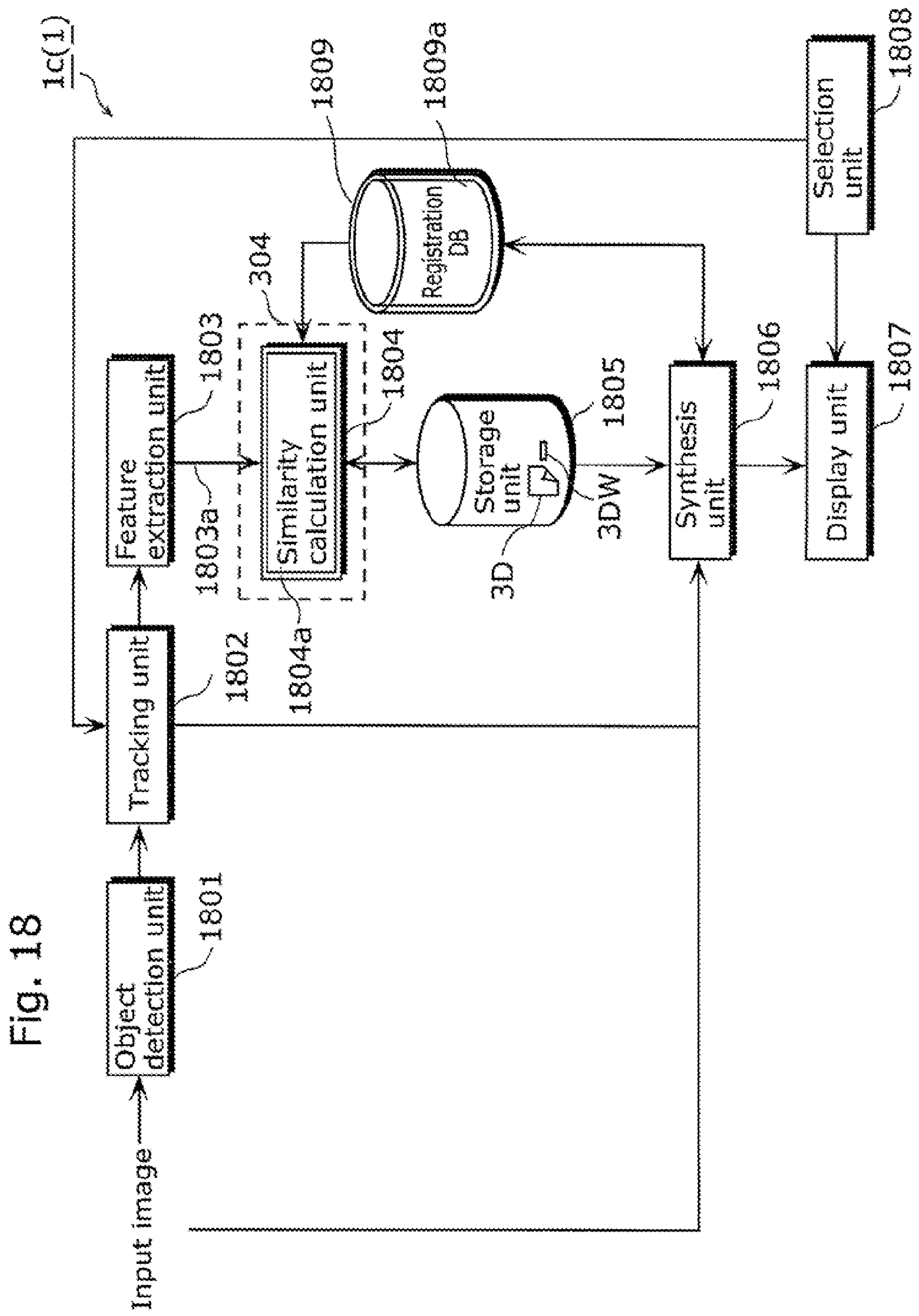
FIG. 18 shows a functional block diagram illustrating a functional configuration of a tracking object selection apparatus according to Embodiment 3 of the present invention.

FIG. 18 is a functional block diagram of a tracking object selection apparatus which uses character information according to Embodiment 3 (an apparatus 1*c*).

The apparatus 1*c* includes an object detection unit 1801, a tracking unit 1802, a feature extraction unit 1803, a similarity calculation unit 1804, a storage unit 1805, a synthesis unit 1806, a display unit 1807, a selection unit 1808, and a registration database (DB) 1809.

Figure 19:
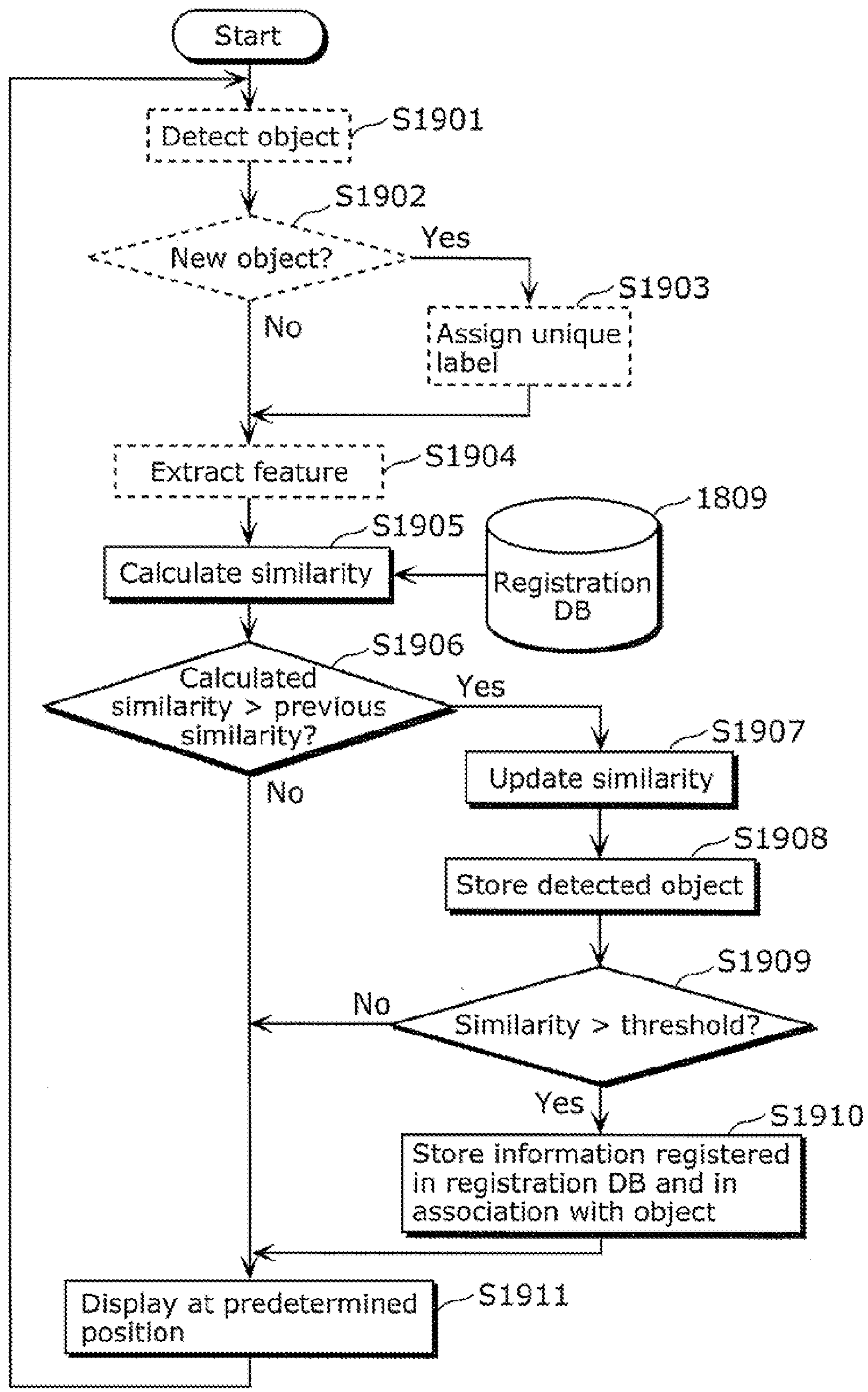
FIG. 19 shows a flowchart of processes up to displaying, illustrating the functional configuration of the tracking object selection apparatus according to Embodiment 3 of the present invention.

FIG. 19 shows a flowchart up to a display process, illustrating a functional configuration (a process configuration) of the tracking object selection apparatus according to Embodiment 3 of the present invention.

Embodiment 3 has many features in common with Embodiment 1, and thus the following particularly describes the steps performed by the determination unit and the following steps (Step S1905 and later) in detail.

In Step S1905, the similarity calculation unit 1804 performs matching between a feature extracted from an image of a candidate tracking object (a feature 1803*a* in FIG. 18) and a feature previously registered in the registration DB (a feature 1809*a*) to calculate similarity between the features (similarity 1804*a* in FIG. 18).

In Step S1906, the similarity calculated in S1905 (the similarity 1804*a*) is compared with previous similarity (Data 3DW in FIG. 18).

When the similarity calculated in Step S1905 is higher than the previous similarity (the similarity of the data 3DW) (Yes in Step S1906), in Step S1907, the pre-registered similarity is updated with the similarity 1804*a*.

Subsequently, in Step S1908, the stored image of the tracking object is updated when the similarity calculated in Step S1905 is higher than the previous similarity (Yes in Step S1906).

In Step S1909, a determination is made as to whether or not the similarity calculated in Step S1905 is higher than a threshold.

When the similarity is higher than the threshold (Yes in Step S1909), in Step S1910, additive information which is registered in the registration DB and in association with the object is also stored in the storage unit.

In Step S1911, the image of the candidate tracking object and the additive information which are stored in the storage unit, and an input image (see an image 92*e* in FIG. 17) are synthesized so that the image of the candidate tracking object and the additive information are displayed at a predetermined position in the input image.

The registration DB 1809 is a database in which face images and additive information (names, etc.) of certain people are registered.

The similarity calculation unit 1804 performs matching of the feature extracted by the feature extraction unit 1803 (the feature 1803*a* in FIG. 18) and the feature previously registered in the registration DB 1809 (the feature 1809*a*). When the similarity calculated by the matching (the similarity 1804*a*) is higher than previous similarity (the similarity of the data 3DW) (Yes in Step S1906 in FIG. 19), the similarity calculation unit 1804 updates the similarity and the image of the tracking object stored in the storage unit with the calculated similarity and the new image. In addition, when the similarity is higher than a threshold (Yes in Step S1909), in Step S1910, the similarity calculation unit 1804 stores additive information which is registered in the registration DB and in association with the image in the storage unit.

The synthesis unit 1806 synthesizes the input image and the image of the tracking object and, if any, the additive information, and causes the display unit to display the resulting image.

Figure 20:
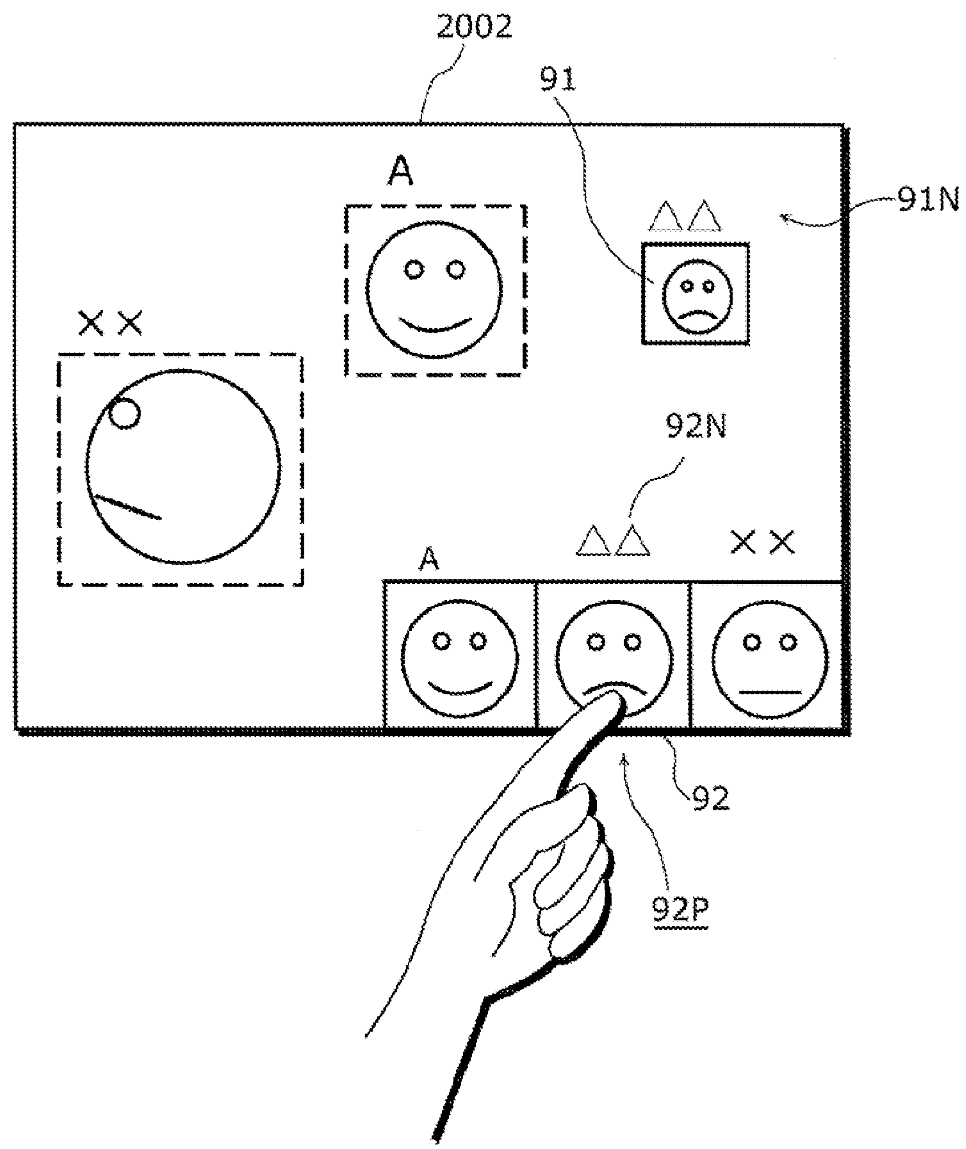
FIG. 20 illustrates an exemplary display according to Embodiment 3 of the present invention.
Figure 21:
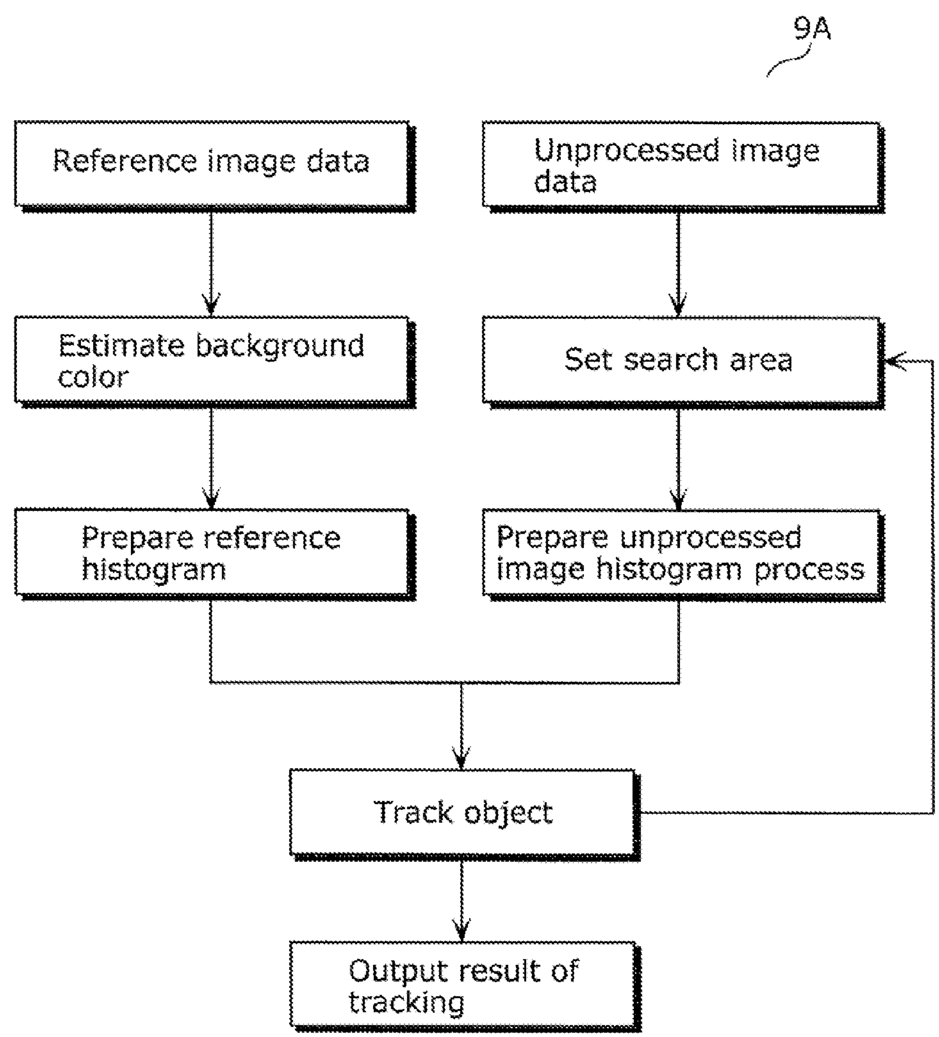
FIG. 21 shows a block diagram according to the conventional techniques.

FIG. 20 illustrates an exemplary display according to Embodiment 3 of the present invention.

A user may have such a display as shown in FIG. 20.

It should be understood that the present invention is not limited to Embodiments above with reference to which the present invention is described. The following is also within the scope of the present invention.

The tracking object apparatus is specifically a computer system including a central processing unit (CPU), a read-only memory (ROM), and a random-access memory (RAM). The RAM stores a computer program. Operations of the CPU according to the computer program allow the apparatus to perform the functions. Here, the computer program includes a combination of instruction codes indicating commands to the computer so that the predetermined functions are performed.

All or part of the components of each of the apparatuses according Embodiments above may be composed of a single system large scale integration (LSI). A system LSI is a super-multifunctional LSI manufactured by integrating a plurality of components on a chip. Specifically, a system LSI is a computer system including components such as a microprocessor, a ROM, and a RAM. In the RAM, a computer program is stored. The system LSI performs the function owing to operation of the microprocessor according to the computer program.

All or part of the components of the apparatuses may be an integrated circuit (IC) card or a unit of a module attachable to the apparatus. The IC card or the module is a computer system including a microprocessor, a ROM, and a RAM. The IC card or the module may also include the super-multifunctional LSI. The IC card or the module achieves the function owing to operation of the microprocessor according to the computer program. The IC card and the module may be tamper-proofed.

The present invention may be implemented as a method in which the processes described above are performed. Furthermore, the present invention may be implemented as a computer program which caused a computer to execute the method or a digital signal representing the computer program.

The present invention may also be implemented as the computer program or the digital signal recorded on a computer-readable recording medium, such as a flexible disc, a hard disk, a compact disc read-only memory (CD-ROM), a magneto-optical disk (MO (disk)), a digital versatile disc (DVD), a DVD-ROM, a DVD-RAM, Blu-ray Disc (BD), a semiconductor memory, or the like. Furthermore, the present invention also may be implemented as the digital signal recorded on such a recording medium.

The present invention may also be implemented as registered data, the computer program or the digital signal transmitted via an electric telecommunication line, wire or wireless communication line, a network typified by the Internet, or data broadcasting.

The present invention may also be implemented as a computer system including a microprocessor which operates according to the computer program and a memory which stores the computer program.

The present invention may also be implemented as the program or the digital signal and a different independent computer system to which the program or the digital signal is transferred via the recording medium or transmitted via the network.

The present invention thus implemented allows a user to select a tracking object even when the tracking object is moving (see (A) of FIG. 2) or has a low level of visibility (see (B) of FIG. 2). The apparatus according to the present invention includes: an object detection unit which detects a predetermined object in an input image; a tracking unit configured to track the detected object (identified) as the same object (at different times); a feature extraction unit which extracts a feature of the tracking object; a determination unit which calculates a state of the detected object (for example, an orientation) from the extracted feature to determine whether or not the detected object is stored; a storage unit in which a score indicating the state of the object to be stored and the image of the tracking object (in the state (orientation) indicated by the score) is stored; a display unit configured to display the input image resulting from the synthesis through which the image of the object (the image of the state indicated by the score) stored in the storage unit is disposed at a predetermined position; and a selection unit which selects, as a tracking object to be tracked in a predetermined process (for example, AF), the detected object displayed at the predetermined position in the display unit.

The object may be a pet such as a cat or a dog. In this case, the image disposed at a predetermined position in an input image as a result of the synthesis (for example, the other image 92 at the position 92P in FIG. 12) may be an image showing hair (color, pattern, texture, and the like of hair) of the pet.

In the case of the process show in FIG. 14, a car running down the road 103R (the object 103*x*) may be monitored.

Then, not only a first image (one image 91) of an object being captured but also a second image (the other image 92) of the object on which a user performs an operation, such as giving a touch, may be displayed in the same manner as, for example, the object (the object B) shown in FIG. 26.

In addition, as represented by an orientation 92*bd* and an orientation 92*md* in FIG. 12, an orientation of one object in a second image (for example, the orientation 92*bd* of the object B in the other image 92*b* in FIG. 12) and an orientation of another object in a second image of (for example, the orientation 92*md* of the object C in the other image 92*m* in FIG. 12) may be the same.

In other words, the objects displayed at the predetermined positions may not be in the same orientation.

Specifically, referring to FIG. 12, the orientation 92*bd* of the object B in the other image 92*b* is the same as the orientation 92*md* of the object C in the other image 92*m*. The objects in the images displayed at the predetermined positions may be in the same orientation as represented by the orientation 92*bd* and the orientation 92*md*.

On the other hand, unlike the example shown in FIG. 12, the orientations (the orientation 92*bd* and the orientation 92*md*) may be different from each other. This is neither detailed nor illustrated for the convenience of the description.

This is also applicable to an orientation 92*dd* and an orientation 92*nd* shown in FIG. 14.

Each of the three first images of the cars A to C shown in FIG. 14 (the one images 91 of the three objects 103*x* shown in the top of FIG. 14) may be a part of an image 9Ib of the road 103R (shown in FIG. 14) captured by the imaging device 103. In other words, the first images (the one images 91 in FIG. 14) may be captured by capturing of the image 9Ib, so that the first images are a part of the captured image 9Ib.

In this manner, for example, the determination unit may calculate a score (the angle 3D1*b* in FIG. 11) indicating the state (the orientation of the captured object), and the image of the candidate tracking object region (the image 3D1*a* in FIG. 11) and the calculated score (the angle 3D1*b*) indicating the state of the image may be stored in the storage unit in association with each other.

Furthermore, the determination unit may determine whether or not to update an score (an angle 3D1*b*) and an image which are previously stored in the storage unit in association with each other with the calculated score (the angle 3Dxb in FIG. 11) and the image (the image 3Dxa) having the state indicated by the score (the angle 3Dxb), by comparison between the score indicating the state (the angle 3Dxb) and the score stored in the storage unit (the angle 3D1*b*). When the determination unit determines to update, the score (the angle 3D1*b*) and the image (the image 3D1*a*) which are previously stored in the storage unit are updated with the calculated score (the angle 3Dxb) and the image having the state indicated by the calculated score (the image 3Dxa in association with the angle 3Dxb), respectively.

Figure 22:
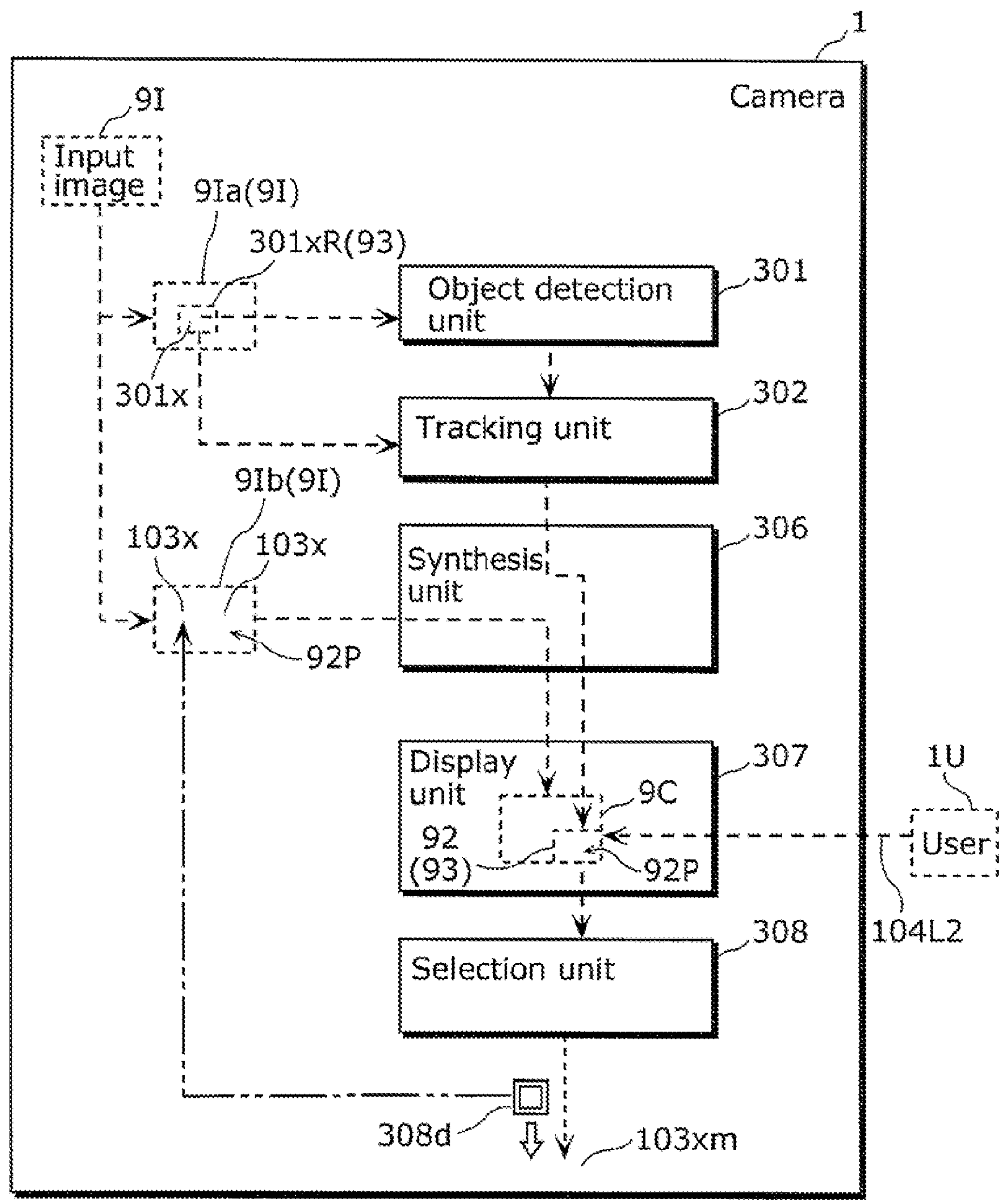
FIG. 22 shows a block diagram of a tracking object selection apparatus.

Furthermore, the feature extraction unit may extract, from the image of the candidate tracking object region, a feature amount (the coordinates 904 in FIG. 9) indicating an orientation (an orientation such as 103*x*1 and 103*x*2 shown in FIG. 12) of an object in the image of the candidate tracking object region (the image 93 in FIG. 22). The determination unit may determine, based on the extracted feature amount, whether or not the orientation indicated by the feature amount is a predetermined orientation (for example, the orientation 103*d* in FIG. 12). When the determination unit determines that the orientation (the orientation such as 103*x*1 or 103*x*2) indicated by the feature amount is the predetermined orientation, the determination unit is configured to store, in the storage unit, the image of the candidate tracking object region (the image 3Dxa in FIG. 11, the region 301*x*R where the image 3Dxa is present (see FIG. 22)) from which the feature amount is extracted.

It is to be noted that "to store a region" means "to store an image of a region".

Furthermore, when the candidate tracking object region (the region 301*x*R in FIG. 22) is a face of a person (a face 8F in FIG. 8), the feature extraction unit may extract, as feature amounts including the feature amount, coordinates of a center position of the face (for example, the coordinates 807 in FIG. 8), coordinates of a position of a nose (the coordinates 808), coordinates of positions of eyes (coordinates 805 and 806), and a face size (Size), and the determination unit may determine whether or not the face is in the predetermined orientation (the orientation 103D in FIG. 12), from a difference (in absolute values) between the coordinates of the center position of the face (the coordinates 807) and the coordinates of the position of the nose (the coordinates 808) and a difference between the coordinates of the center position of the face (the coordinates 807) and coordinates of a midpoint (the coordinates 805*a*) of the positions of the eyes (the coordinates 805 and 806).

Furthermore, the feature extraction unit may extract, from the image of the candidate tracking object region (the region 301*x*R in FIG. 22), a feature amount indicating an expression on a face of a person in the image of the candidate tracking object region, and the determination unit is configured to determine whether or not the expression on the face of the person is a smile, based on the extracted feature amount.

It is to be noted that the determination as to whether or not an expression is a smile may be made by a process using a known technique.

Furthermore, the feature extraction unit may extract, from the image of the candidate tracking object region (the region 301*x*R), a feature amount necessary for character recognition (such as a position or a direction of an edge of a character), and the determination unit may determine whether or not a character on the object has been successfully recognized based on the extracted feature amount.

Furthermore, the feature extraction unit may extract, from the image of the candidate tracking object region (the region 301*x*R), a feature amount necessary for object recognition, and the determination unit may make a determination by performing matching between a feature previously registered in the storage unit and a feature indicated by the extracted feature amount.

It is to be noted that the object recognition refers to identification of the object in the candidate tracking object region from a plurality of objects.

Furthermore, the synthesis unit may synthesize additive information (a label (of a name, for example) as shown by the image 92N) obtained by the determination unit in addition to the input image and the image of the candidate tracking object region (the image 92 of the region 301*x*R).

In addition, the other image 92 displayed at the time of the upper picture in FIG. 26 may be displayed in Step S501*a* in FIG. 5, and the other image 92 displayed at the time of the lower picture in FIG. 26 may be displayed in Step S501*b*.

In addition, generation of selection data 308*d* (see FIG. 22) identifying the object to be selected as a tracking object 103*xm* (see FIG. 22) allows selection of an object specified by data 208*d* as the tracking object 103*xm*.

Furthermore, the object (the object B) in the displayed other image (the image 92 in FIG. 25) may have a size (the size 92S) equal to or larger than a predetermined threshold (the threshold Th) and not smaller than the predetermined threshold (the threshold Th). The size does not need to be as small as the image 91*b* in FIG. 91*b* or the size 912S in FIG. 27.

The size 92S of the other image 92, which is larger than the threshold, allows a user to easily identify the image 91, as the image of the object B, among the images of the objects A to C by seeing the other image 92 (see FIG. 25). With this, the user may more easily determine whether or not performing an operation 92L on the other image 92 is appropriate, and thus the operation is further facilitated.

It is to be noted that the threshold Th may be a size such that a user has a difficulty in performing an operation on an image of an object (for example, the image 91*b* in FIG. 2 or the image 912 in FIG. 27) having a size smaller than Th (for example, the largest one of such small sizes).

Furthermore, an orientation of the object (an orientation 92*d* in FIG. 28) in the displayed other image (the image 92 in FIG. 25) may be the same as a predetermined orientation (that is, the orientation 103*x*2 toward the imaging device 103 (the camera 1)) and not different from the predetermined orientation (the orientation 103*d* in FIG. 12). That is, the orientation of the object does not need to be different orientations (for example, backward or diagonally backward left as exemplified by the orientation 103$x$1, the orientation 913$d$ in FIG. 28, and the orientation shown in the image 91$c$ in FIG. 2).

Figure 28:
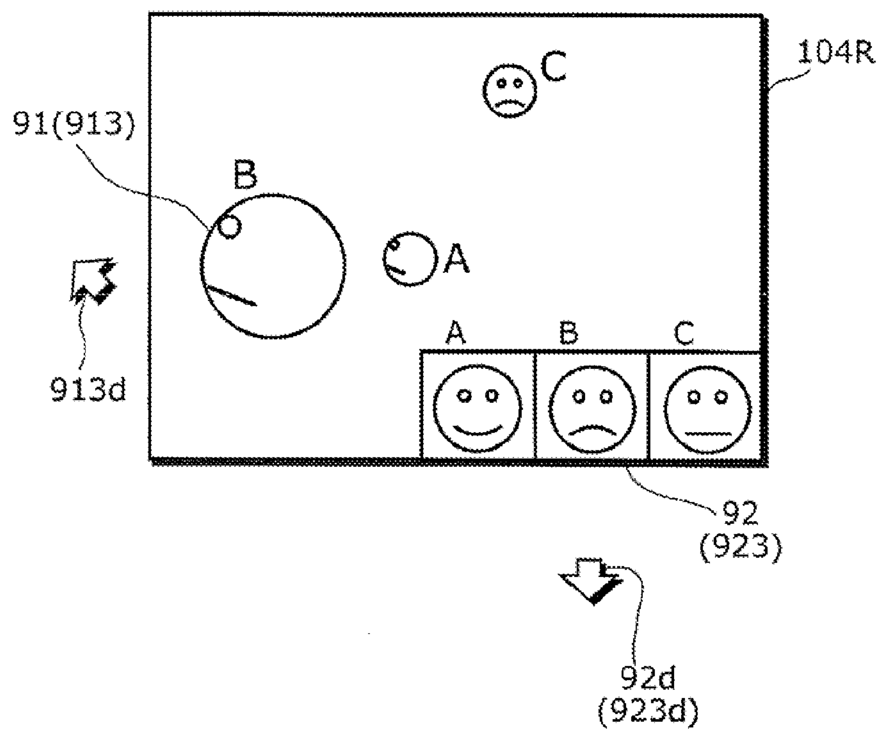
FIG. 28 shows an image of an object not in a frontal orientation.

It is to be noted that the orientation of the object is, for example, a direction which a part of the object having more features than any other part of the object faces (for example, see the orientation 92$d$ in FIG. 28 and the orientation 92$dd$ in FIG. 14).

The predetermined orientation is, for example, the same as (or approximate to) the orientation 103$d$ in which the object faces the imaging device 103 (see FIG. 12).

In this configuration, the user easily sees (the features of) the frontal appearance of the object (see the image 92 in FIG. 25 and the image 92 in FIG. 14) so that the user may more easily identify an object among objects (for example, the object B among the objects A to C in FIG. 25) as the object present in the other image 92.

It is to be noted that, for example, the image 911 in FIG. 26 may move from the position 911PM (in the upper picture) to the position 911PN (in the lower picture), have a size smaller than the threshold voltage Th (the size 912S in FIG. 27 smaller than Th in FIG. 25), and be an image of an object (the object B) in an orientation other than the predetermined orientation (the orientation 103$d$ in FIG. 12), such as the orientation 103$x$1 or the orientation diagonally backward left as shown by the image 911 in FIG. 26.

When the one image 911 is captured as such, the other image 921 (in FIG. 26) may be displayed at a predetermined position (the position 92P in FIG. 25 and FIG. 26), have a large size 925 (see FIG. 25), and be an image of the object in an orientation which is the same as the predetermined one (the orientation 103$x$2 in FIG. 12).

In this configuration, a user may easily operate the imaging apparatus even when the one image 911 as such is captured, so that the user's operation is made easier to a sufficiently higher degree.

Figure 24:
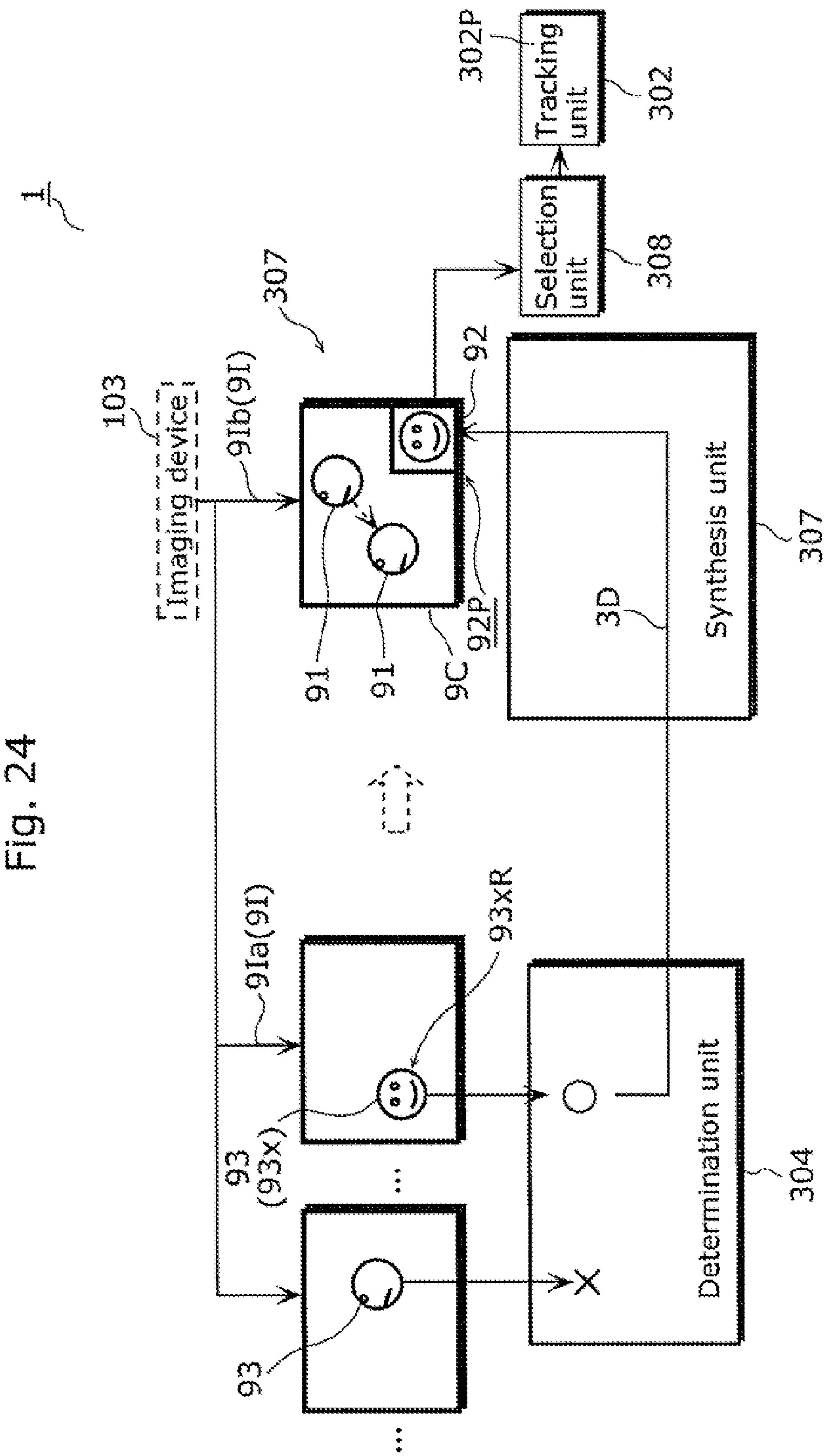
FIG. 24 shows captured images.

Furthermore, the imaging device may capture a preceding image (the preceding image 93$x$ in an orientation in FIG. 24) of an object before capturing the one image (the image 91 in FIG. 28), the one image being a following image (the one image 91 (the following image) in FIG. 24), the object (the object B) of the preceding image being the same as the object of the following image (the object B in FIG. 28), and the object of the preceding image being in the same orientation (the orientation 103$x$2) as the predetermined orientation (the orientation 103$d$ in FIG. 12), and the display unit may display the other image generated using information on in association with the preceding image (the other image 92 in FIG. 28 generated by the synthesis unit 306 (see FIG. 24 and FIG. 3) using the information 3D (see FIG. 24 and FIG. 3) of the captured preceding image 93$x$), the object of the generated other image being in the same orientation (the orientation 103$x$2 in FIG. 12 and the orientation 92$d$ in FIG. 28) as the predetermined orientation.

In this configuration, simply capturing the image 93$x$ (see FIG. 24) makes information for display of the other image 92 (information 3D in FIG. 24, FIG. 3, etc.) available, so that the other image 92 may be easily displayed.

It is also possible that, as described above, an appropriate one is selected from a plurality of images 93 (FIG. 24) for use. For example, the image 93$x$ (FIG. 24) may be selected, for use as the image 92, from the image 93 of the object in the appropriate orientation 103$x$2 and the image 93 of the object in the inappropriate orientation 103$x$1.

Furthermore, the display unit may display, as the other image (the other image 92) of the object (for example, the car C in FIG. 17), an image (the other image 92$e$) generated from yet an other image (the image 93 in FIG. 17 (the preceding image 93 in FIG. 24)) of the object (the object C) and showing a character (the text 92$e$2 in FIG. 17, "奈良 330xx-oo") which identifies the object (the object C) among a plurality of objects (the objects A to C), yet the other image being different from the one image (the one image 91$e$) and the other image (the other image 92$e$) of the object.

Furthermore, the synthesis unit (the synthesis unit 306) may synthesize an image (the other image 92$e$) in which the character (the text 92$e$2, that is, "奈良 330xx-oo") recognized in yet the other image (the image 93 in FIG. 17) being different from the one image (the one image 91$e$) and the other image (the other image 92$e$) is disposed on the yet other image (the image 93), and the display unit may display the synthesized image (the other image 92$e$) as the other image (the other image 92).

In this configuration, the user is allowed to identify an object more easily, and thus the user's operation is easier to a sufficiently higher degree.

For example, when the object is the face 8F in FIG. 8, characters (text) indicating information such as the name of the object may be displayed.

It is to be noted that the character recognition unit 1504 (see FIG. 15, etc.) for the character recognition may be provided. The character recognition unit 1504 may be provided as a part of the determination unit 304 as shown in FIG. 15 or may be provided externally to the determination unit 304.

Figure 23:
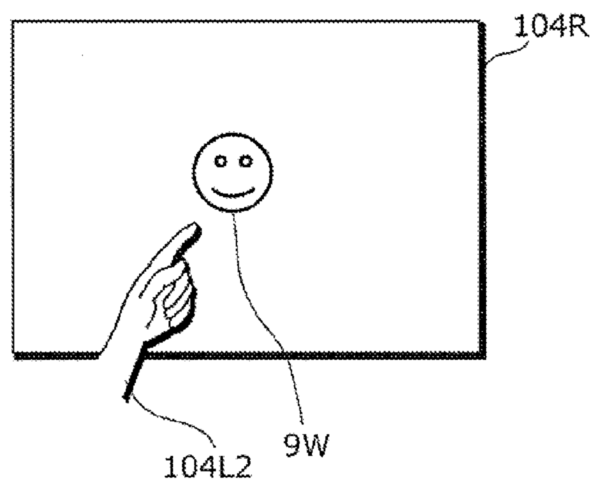
FIG. 23 shows a display.

In an aspect of the present invention, for example, an image 9W shown in FIG. 23 is captured as the above one image 91. Then, similarly to the other image 92 shown in FIG. 25, the image 9W may be an image which does not move (for a given time), have a large size of 92S, and show an object in the same orientation as the predetermined orientation (the orientation 103$x$2 shown in FIG. 12).

Figure 27:
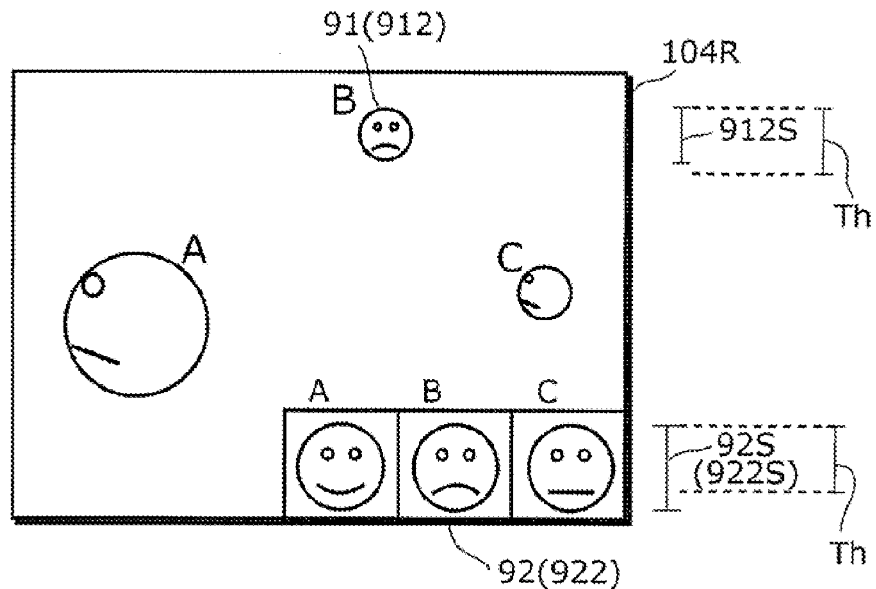
FIG. 27 shows images of a small size.

Even in such a case, the other image of the object in the one image 91 (the image 9W, the image 912, or the like), that is, the other image 92, may be displayed when the one image 91 is captured and displayed whether the one image 91 captured is the image 9W or an image different from the image 9W (for example, the one image 911 in FIG. 26 the one image 912 in FIG. 27, the one image 913 in FIG. 28).

In this configuration, the other image 92 is displayed even when the image 9W is captured and displayed, and a process is performed which is the same as the process performed when the image different from the image 9W, is captured, so that the process of displaying the image may be made easier.

In addition, a user is allowed to have the same display as when the image different from the image 9W is captured, and it is easier for the user to use.

The present invention thus provides easier process and easier display at once.

When a camera according to the present invention is, for example, a consumer digital camera, a user of the camera will take images of preferable objects when the user wants. It is thus impossible (or difficult) to predict what will be objects of the images to be taken by the user.

The camera may be a camera which captures an image of the object 103$x$ which happens to appear, such as a car running down the road 103R (for example, a monitoring camera).

In addition, as shown in FIG. 13, when there is the one image 91 at the position 91P and the other image 32 at the position 92P, and a user performs an operation 104L2 on the image 92, an indication (a thick line) 91$x$ indicating that the operation 104L2 has been performed may be displayed not around the position 92P of the other image 92 but only around the position 91P of the one image 91.

This simplifies the display, and thus provides the user with a display easier to use.

A more specific example of the other image 92 displayed at the predetermined position may be an image 9X not of the appearance of the object (see an image 92*e*1 in FIG. 17) of a set of characters 9X1 (see a set of characters 92*e*2 in the image 92*e* in FIG. 17) recognized through character recognition.

With this, a user may easily operate the camera with the display which includes not only captured one image 91*e* identifying an object (a car B) out of a plurality of objects (cars A to C) but also the other image 9X identifying the object (showing a set of characters on the object, the car B, "大 阪 550 な oo-xx"). Furthermore, because the other image 9X is displayed at the predetermined position, the user's operation is made sufficiently easier and the image is appropriately positioned for sure. In addition, such a simple display only including a set of characters 9X1 is easy to understand and sufficiently appropriate.

In this manner, such configurations (including the display unit 307 and the selection unit 308) are combined to produce a synergetic effect. In contrast, the known conventional techniques lack all or part of the configurations so that no such a synergetic effect is produced. The present invention is thus in advance of the conventional techniques in configurations, mechanism, and effects.

The techniques described for the different embodiments according to the present invention for use in different parts of the imaging apparatus may be used in combination. The present invention disclosed herein also includes such combinations of the techniques.

As shown in FIG. 26, for example, the image 91 of the object B has a predetermined relative position, which is a first relative position 9213M, with respect to another object at a first time (specifically, the position 911PM or the position 911PN of the image 911 of the object B at the time of the upper picture is to the right of the position 921XM of the one image 91 of another object A).

On the other hand, at a second time, the image 91 of the object B has a second relative position 9213N with respect to the image of the other object at the second time (specifically, the position of the image 911 is to the left of the position 921XN of the image 91 of the other object A at the second time).

In contrast, the other image 92 of the object B is disposed at the same relative position 9223 with respect to another image 92 of another object both at the first time and the second time (specifically, the position 921P of the other image 92 of the object B keeps to the right of the positions 922X (922XM and 922XN) of the other image 921 of the object A).

In this manner, even when the relative positions of the images 91 of the object B changes from the first relative position 9213M to the second relative position 9213N, a user do not have to perform an operation on an image at a relative position (for example, a relative position at which the image of the object B is to the left of the image of the object A (not shown)) other than the relative position 9223 (a relative position at which the image of the object B is to the right of the image of the object A). Thus, operations on the images are to be performed on the image at the same relative position 9223 (see the relative position 9223 in the lower picture, where the image of the object B is to the right of the image of the object A), so that the user's operations are made more secure and easier.

All or part of the tracking object selection apparatus (camera) 1 may be configured as a computer 1C (see FIG. 1) including the CPU 101 (see FIG. 1) as shown in FIG. 1. The computer 1C may provide one or more of the above features by executing the computer program 1P in FIG. 1 (for example, the aforementioned image processing program). The computer program 1P may be stored in the ROM 102.

The computer 1C may be included in an appropriate circuit so that an integrated circuit 1L (see FIG. 1) which provides one or more of the above features is built.

It is to be noted that the present invention may be implemented as a method or a data structure including one or more of the above steps.

The reference sign 705 denotes an image of at a time T+a, and the object in the image is the same as the object labeled as A displayed at a time T. The reference sign 706 denotes an image at a time T+a, and the object in the image is the same as the object labeled as B displayed at a time T. The reference sign 707 denotes an image of a newly detected object, and the object is labeled as C. The reference sign 901 denotes candidate detected face boxes output by a 75-degree right face detection unit. The reference sign 902 denotes candidate detected face boxes output by a 30-degree right face detection unit. The reference sign 903 denotes candidate detected face boxes output by a front face detection unit. The reference sign 1001 denotes candidate detected face boxes output by the 75-degree right face detection unit and provided with an offset. The reference sign 1002 denotes candidate detected face boxes output by the 30-degree right face detection unit and provided with an offset. The reference sign 1003 denotes candidate detected face boxes output by the front face detection unit and provided with an offset. The reference sign 104L2 denotes an operation for selecting an object at a predetermined position.

INDUSTRIAL APPLICABILITY

The tracking object selection apparatus, and a method of selecting a tracking object, and a recording medium for the same according to the present invention are applicable because they easily select an object, track the object, and control AF and AE when an images is captured using a digital video camera or a digital video camera in various types of scenes, and thus allowing easy and successful shooting.

REFERENCE SIGNS LIST

- 101 CPU
- 102 ROM
- 103 Camera
- 104 Display unit
- 105 RAM
- 106 External storage unit
- 108 Interface unit
- 301 Object detection unit
- 302 Tracking unit
- 303 Feature extraction unit
- 304 Determination unit
- 305 Storage unit
- 306 Synthesis unit
- 307 Display unit
- 308 Selection unit
- 701 Picture frame at time T
- 702 Image labeled as A
- 703 Image labeled as B
- 704 Picture frame at time T+a
- 801 Right eye on face in frontal orientation
- 802 Left eye on face in frontal orientation
- 803 Center position of face in frontal orientation
- 804 Nose of face in frontal orientation

805 Right eye on face facing right
806 Left eye on face facing right
807 Center position of face facing right
808 Nose of face facing right
904 Center position of face
1004 Coordinates of position of nose
1200 Display
1201 Image disposed on picture
1302 Selected object
9X1 Recognized characters
1809 Registration database (DB)

The invention claimed is:

1. A tracking object selection apparatus which selects a tracking object, said tracking object selection apparatus comprising:

an object detection unit configured to detect a predetermined object in an input image;

a tracking unit configured to track the object detected by said object detection unit and calculate a candidate tracking object region in which the tracking object is present;

a synthesis unit configured to synthesize the input image and an image of the candidate tracking object region calculated by said tracking unit so that the image of the candidate tracking object region is disposed at a predetermined position in the input image;

a display unit configured to display the input image in which the image of the candidate tracking object region is disposed at the predetermined position as a result of the synthesis by said synthesis unit; and a selection unit configured to select a tracking object in a predetermined process, wherein, when a user performs an operation on the image displayed on said display unit and disposed at the predetermined position in the input image as a result of the synthesis, said selection unit is configured to select, as the tracking object, the object detected in the image on which the operation has been performed.

2. The tracking object selection apparatus according to claim 1, further comprising:

a feature extraction unit configured to extract a predetermined feature from the image of the candidate tracking object region in which the object being tracked by said tracking unit is present;

a determination unit configured to calculate a state of the candidate tracking object from the feature extracted by said feature extraction unit and to determine whether or not the calculated state is a predetermined state; and a storage unit in which the image of the candidate tracking object region is stored when said determination unit determines that the calculated state of the candidate tracking object region is the predetermined state.

3. The tracking object selection apparatus according to claim 2, wherein said determination unit is configured to calculate a score indicating the state, and the calculated score indicating the state of the image of the candidate tracking object region and the image of the candidate tracking object region is stored in said storage unit in association with each other.

4. The tracking object selection apparatus according to claim 2, wherein said determination unit is configured to determine whether or not to update an score and an image which are previously stored in said storage unit in association with each other with a calculated score indicating the state and the image having the state indicated by the calculated score, by comparison between the score previously stored in said storage unit and the calculated score indicating the state, and, when the determination unit determines to update, the score and the image which are previously stored in said stored unit are updated with the calculated score and the image having the state indicated by the calculated score, respectively.

5. The tracking object selection apparatus according to claim 2, wherein said feature extraction unit is configured to extract, from the image of the candidate tracking object region, a feature amount indicating an orientation of an object in the image of the candidate tracking object region, and said determination unit is configured to determine, based on the extracted feature amount, whether or not the orientation indicated by the feature amount is a predetermined orientation, and, when said determination unit determines that the orientation indicated by the feature amount is the predetermined orientation, said determination unit is configured to store, in said storage unit, the image of the candidate tracking object region from which the feature amount is extracted.

6. The tracking object selection apparatus according to claim 5, wherein the candidate tracking object region is a region including a face of a person, said feature extraction unit is configured to extract, as feature amounts including the feature amount, coordinates of a center position of the face, coordinates of a position of a nose, coordinates of positions of eyes, and a face size, and said determination unit is configured to determine whether or not the face is in the predetermined orientation, from a difference between the coordinates of the center position of the face and the coordinates of the position of the nose and a difference between the coordinates of the center position of the face and coordinates of a midpoint of the positions of the eyes.

7. The tracking object selection apparatus according to claim 2, wherein said feature extraction unit is configured to extract, from the image of the candidate tracking object region, a feature amount indicating an expression on a face of a person in the image of the candidate tracking object region, and said determination unit is configured to determine whether or not the expression on the face of the person is a smile, based on the extracted feature amount.

8. The tracking object selection apparatus according to claim 2, wherein said feature extraction unit is configured to extract, from the image of the candidate tracking object region, a feature amount necessary for character recognition, and said determination unit is configured to determine whether or not a character on the object has been successfully recognized based on the extracted feature amount.

9. The tracking object selection apparatus according to claim 2, wherein said feature extraction unit is configured to extract, from the image of the candidate tracking object region, a feature amount necessary for object recognition, and said determination unit is configured to make a determination by performing matching between a feature previously registered in said storage unit and a feature indicated by the extracted feature amount.

10. The tracking object selection apparatus according to claim 2, wherein said synthesis unit is configured to dispose, in addition to the image of the candidate tracking object region, additive information obtained by said determination unit on the input image.

11. The tracking object selection apparatus according to claim 1, wherein said tracking object selection apparatus is a camera including an imaging device for capturing one image of an object, said display unit is configured to display the captured one image and an other image of the object, said selection unit is configured to select the object in the one image as the tracking object to be tracked in a predetermined process, when an operation is performed on the other image displayed on said displayed unit, and the other image is displayed at the same position at a first time and a second time among different times.

12. The tracking object selection apparatus according to claim 11, wherein the object in the displayed other image has a size equal to or larger than a predetermined threshold and not smaller than the predetermined threshold.

13. The tracking object selection apparatus according to claim 11, wherein an orientation of the object in the displayed other image is the same as a predetermined orientation and not different from the predetermined orientation.

14. The tracking object selection apparatus according to claim 13, wherein said imaging device is configured to capture a preceding image of an object before capturing the one image, the one image being a following image, the object of the preceding image being the same as the object of the following image, and the object of the preceding image being in the same orientation as the predetermined orientation, and said display unit is configured to display the other image generated using information in association with the preceding image, the object of the generated other image being in the same orientation as the predetermined orientation.

15. The tracking object selection apparatus according to claim 11, wherein said display unit is configured to display, as the other image of the object, an image generated from yet an other image of the object and showing a character which identifies the object among a plurality of objects, yet the other image being different from the one image and the other image of the object.

16. The tracking object selection apparatus according to claim 15, wherein said synthesis unit is configured to synthesize an image in which the character recognized in yet the other image being different from the one image and the other image is disposed on the yet other image, and said display unit is configured to display the synthesized image as the other image.

17. An integrated circuit included in a tracking object selection apparatus which selects a tracking object, said integrated circuit comprising:

an object detection unit configured to detect a predetermined object in an input image;

a tracking unit configured to track the object detected by said object detection unit and calculate a candidate tracking object region in which the tracking object is present;

a synthesis unit configured to synthesize the input image and an image of the candidate tracking object region calculated by said tracking unit so that the image of the candidate tracking object region is disposed at a predetermined position in the input image;

a display control unit configured to cause a display unit to display the input image in which the image of the candidate tracking object region is disposed at the predetermined position as a result of the synthesis by said synthesis unit; and a selection unit configured to select a tracking object in a predetermined process, wherein, when a user performs an operation on the image displayed on the display unit and disposed at the predetermined position in the input image as a result of the synthesis, said selection unit is configured to select, as the tracking object, the object detected in the image on which the operation has been performed.

18. A method of selecting a tracking object, said method comprising:

detecting a predetermined object in an input image;

tracking the object detected by said object detection unit and calculating a candidate tracking object region in which the tracking object is present;

synthesizing the input image and an image of the candidate tracking object region calculated in said tracking and calculating so that the image of the candidate tracking object region is disposed at a predetermined position in the input image;

displaying the input image in which the image of the candidate tracking object region is disposed at the predetermined position as a result of the synthesizing; and selecting a tracking object in a predetermined process, wherein, when a user performs an operation on the image displayed in said displaying and disposed at the predetermined position in the input image as a result of said synthesizing, the object detected in the image on which the operation has been performed is selected as the tracking object.

19. A non-transitory computer-readable recording medium having a program thereon for causing a computer to select a tracking object by executing:

detecting a predetermined object in an input image;

tracking the object detected by said object detection unit and calculating a candidate tracking object region in which the tracking object is present;

synthesizing the input image and an image of the candidate tracking object region calculated in said tracking and calculating so that the image of the candidate tracking object region is disposed at a predetermined position in the input image;

causing a display unit to display the input image in which the image of the candidate tracking object region is disposed at the predetermined position as a result of said synthesizing; and selecting a tracking object in a predetermined process, wherein, when a user performs an operation on the image displayed on the display unit and disposed at the predetermined position in the input image as a result of said synthesizing, the object detected in the image on which the operation has been performed is selected as the tracking object.

* * * * *